US012368821B2

(12) United States Patent
Krol et al.

(10) Patent No.: US 12,368,821 B2
(45) Date of Patent: Jul. 22, 2025

(54) OPTIMIZING PHYSICS FOR STATIC OBJECTS IN A THREE-DIMENSIONAL VIRTUAL ENVIRONMENT

(71) Applicant: Katmai Tech Inc., New York, NY (US)

(72) Inventors: Gerard Cornelis Krol, Leiden (NL); Petr Polyakov, Tampa, FL (US)

(73) Assignee: Katmai Tech Inc., New York, NY (US)

( * ) Notice: Subject to any disclaimer, the term of this patent is extended or adjusted under 35 U.S.C. 154(b) by 110 days.

(21) Appl. No.: 17/875,581

(22) Filed: Jul. 28, 2022

(65) Prior Publication Data
US 2024/0040085 A1 Feb. 1, 2024

(51) Int. Cl.
*H04N 7/15* (2006.01)
*G06F 3/04815* (2022.01)
*H04L 12/18* (2006.01)
*H04N 21/44* (2011.01)

(52) U.S. Cl.
CPC ......... *H04N 7/157* (2013.01); *G06F 3/04815* (2013.01); *H04L 12/1827* (2013.01); *H04N 21/44012* (2013.01)

(58) Field of Classification Search
None
See application file for complete search history.

(56) References Cited

U.S. PATENT DOCUMENTS

| | | |
|---|---|---|
| 6,215,498 B1 | 4/2001 | Filo et al. |
| 6,348,927 B1 * | 2/2002 | Lipkin ................ G06F 16/27 |
| | | 345/619 |
| 6,559,863 B1 | 5/2003 | Megiddo |
| 6,583,808 B2 | 6/2003 | Boulanger et al. |
| 6,853,398 B2 | 2/2005 | Malzbender et al. |
| 7,197,126 B2 | 3/2007 | Kanada |
| 7,346,654 B1 | 3/2008 | Weiss |
| 7,634,073 B2 | 12/2009 | Kanada |
| 7,840,668 B1 | 11/2010 | Sylvain et al. |
| 8,072,479 B2 | 12/2011 | Valliath et al. |
| 8,279,254 B2 | 10/2012 | Goose et al. |
| 8,403,751 B2 | 3/2013 | Boustead et al. |
| 8,520,872 B2 | 8/2013 | Jang et al. |
| 8,620,009 B2 | 12/2013 | Zhang et al. |
| 9,041,764 B2 | 5/2015 | Wang et al. |

(Continued)

FOREIGN PATENT DOCUMENTS

| | | |
|---|---|---|
| CN | 103580881 A | 2/2014 |
| CN | 105487657 A | 4/2016 |

(Continued)

OTHER PUBLICATIONS

Merriam-Webster. (n.d.). Fixed. In Merriam-Webster.com dictionary. Retrieved Jan. 18, 2023 from https://www.merriam-webster.com/dictionary/fixed (Year: 2023).*

(Continued)

*Primary Examiner* — Linda Huynh
(74) *Attorney, Agent, or Firm* — Sterne, Kessler, Goldstein & Fox P.L.L.C.

(57) ABSTRACT

Disclosed herein is a web-based videoconference system that allows for video avatars to navigate within a virtual environment. Various methods for efficient modeling, rendering, and shading are disclosed herein.

21 Claims, 26 Drawing Sheets

(56) References Cited

U.S. PATENT DOCUMENTS

| | | | |
|---|---|---|---|
| 9,218,685 | B2 | 12/2015 | Piemonte et al. |
| 9,305,319 | B2 | 4/2016 | Maor et al. |
| 9,384,594 | B2 | 7/2016 | Maciocci et al. |
| 9,420,229 | B2 | 8/2016 | Pourashraf et al. |
| 9,565,316 | B2 | 2/2017 | Gleim |
| 9,607,428 | B2 | 3/2017 | Li |
| 9,656,168 | B1 | 5/2017 | Bear et al. |
| 9,661,274 | B2 | 5/2017 | Kubota et al. |
| 9,743,044 | B2 | 8/2017 | Safaei et al. |
| 9,910,509 | B2 | 3/2018 | Markovic et al. |
| 10,013,805 | B2 | 7/2018 | Barzuza et al. |
| 10,101,585 | B2* | 10/2018 | Ueno ............... G09G 5/00 |
| 10,155,164 | B2 | 12/2018 | Boustead et al. |
| 10,304,238 | B2 | 5/2019 | Cooper et al. |
| 10,304,239 | B2 | 5/2019 | Gorur Sheshagiri et al. |
| 10,334,384 | B2 | 6/2019 | Sun et al. |
| 10,356,216 | B2 | 7/2019 | Khalid et al. |
| 10,573,071 | B2 | 2/2020 | Sun et al. |
| 10,609,334 | B2 | 3/2020 | Li |
| 10,679,411 | B2 | 6/2020 | Ziman |
| 10,979,672 | B1* | 4/2021 | Krol ............... G06F 3/011 |
| 11,057,351 | B1 | 7/2021 | Simanel et al. |
| 11,711,494 | B1* | 7/2023 | Krol ............... H04N 7/157 715/757 |
| 11,741,674 | B1* | 8/2023 | Swanson ........... G06T 15/20 345/427 |
| 11,924,442 | B2* | 3/2024 | Hindriks ........... G06T 15/40 |
| 11,956,571 | B2* | 4/2024 | Krol ............... H04N 7/157 |
| 2002/0158873 | A1 | 10/2002 | Williamson |
| 2005/0062738 | A1* | 3/2005 | Handley ........... B33Y 50/00 345/419 |
| 2007/0274528 | A1 | 11/2007 | Nakamoto et al. |
| 2009/0033737 | A1* | 2/2009 | Goose ............. H04N 7/15 348/E7.083 |
| 2009/0113314 | A1 | 4/2009 | Dawson et al. |
| 2011/0072367 | A1 | 3/2011 | Bauer |
| 2011/0077923 | A1* | 3/2011 | Bond ............. A63F 13/10 703/2 |
| 2011/0199377 | A1* | 8/2011 | Jang ............. G06T 15/20 345/426 |
| 2013/0321564 | A1 | 12/2013 | Smith et al. |
| 2014/0058807 | A1 | 2/2014 | Altberg et al. |
| 2014/0108915 | A1* | 4/2014 | Lu ............... G06F 3/04883 715/234 |
| 2014/0267230 | A1* | 9/2014 | Osuna ........... A63F 13/58 345/419 |
| 2014/0267564 | A1* | 9/2014 | Pourashraf ....... H04N 7/157 348/14.08 |
| 2015/0302661 | A1 | 10/2015 | Miller |
| 2016/0227172 | A1* | 8/2016 | Safaei ........... G06T 19/006 |
| 2016/0307353 | A1* | 10/2016 | Ligenza .......... G06T 13/20 |
| 2017/0351476 | A1 | 12/2017 | Yoakum |
| 2018/0095636 | A1* | 4/2018 | Valdivia ......... G06F 3/0482 |
| 2018/0253884 | A1* | 9/2018 | Burnett, III ..... H04N 13/351 |
| 2019/0199993 | A1 | 6/2019 | Babu J D et al. |
| 2019/0310761 | A1 | 10/2019 | Agarawala et al. |
| 2019/0320144 | A1 | 10/2019 | Tong et al. |
| 2019/0354170 | A1 | 11/2019 | Rosedale |
| 2019/0371060 | A1 | 12/2019 | Energin et al. |
| 2020/0008003 | A1 | 1/2020 | Thompson et al. |
| 2020/0037091 | A1 | 1/2020 | Jeon et al. |
| 2020/0098191 | A1 | 3/2020 | McCall |
| 2020/0221247 | A1 | 7/2020 | Latypov et al. |
| 2020/0302681 | A1* | 9/2020 | Totty ........... G06T 15/205 |
| 2021/0365277 | A1* | 11/2021 | Sproch .......... G06F 8/75 |
| 2022/0086203 | A1* | 3/2022 | Morris .......... H04N 7/157 |
| 2023/0141027 | A1* | 5/2023 | Cerrato ......... G06F 3/013 345/419 |
| 2023/0149811 | A1* | 5/2023 | Myers .......... G06T 15/60 463/31 |
| 2024/0040086 | A1* | 2/2024 | Krol ........... G06T 19/20 |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

Merriam-Webster. (n.d.). Static. In Merriam-Webster.com dictionary. Retrieved Jan. 18, 2023 from https://www.merriam-webster.com/dictionary/static (Year: 2023).*

Dipaola, S. and Collins, D., "A 3D Virtual Environment for Social Telepresence", Mar. 2002; 6 pages.

EngageVR, "Next Generation Education, Training, Meetings & Events," accessed at https://engagevr.io/, accessed on Oct. 28, 2020; 6 pages.

Event Farm, "Bring Your Events Into the Virtual World," accessed at https://eventfarm.com/the-echo, accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersive.ly/best-vr-apps-productive-remote-meetings/, accessed on Oct. 28, 2020; 10 pages.

Leung, W. and Chen, T., "Networked Collaborative Environment With Animated 3D Avatars, Dept. of Electrical and Computer Engineering Carnegie Mellon University," Aug. 6, 2002; 3 pages.

Leung, W et al.. , "Networked Intelligent Collaborative Environment (NetICE), Multimedia and Expo 2000," Aug. 6, 2002; 4 pages.

Leung, W. and Chen, T., "A Multi-User 3-D Virtual Environment With Interactive Collaboration and Shared Whiteboard Technologies, Kluwer Academic Publishers," Jul. 23, 2003, 17 pages.

Lin, J. et al., "A Virtual Reality Platform for Dynamic Human-Scene Interaction," Dec. 2016; 4 pages.

Nishihara, R. and Okubo, M., "A Study on Personal Space in Virtual Space Based on Personality," 2015; 8 pages.

Sandre, A., "Is Virtual Reality the Future of Video Conferencing?" May 15, 2020; 7 pages.

De Sousa, A., "Remote Proxemics for Collaborative Virtual Environments," Nov. 2014; 10 pages.

Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.

Teooh, "Virtual Spaces for Real Communities," accessed at https://teooh.com/, accessed on Oct. 28, 2020; 3 pages.

VirBELA Media, "Team Suites," accessed at https://www.virbela.com/teamsuites, accessed on Oct. 1, 2020; 26 pages.

Virtway Events, "Your 3D Space for Events," accessed at https://www.virtwayevents.com/, accessed on Oct. 28, 2020; 5 pages.

SaganWorks product website, "A personal metaverse of knowledge: Create stunning spaces to organize and store your information," available at https://saganworks.com, accessed Aug. 4, 2022; 4 pages.

Spatial, "Frequently Asked Questions," product website available at https://support.spatial.io/hc/en-us, accessed Aug. 4, 2022; 3 pages.

(56) References Cited

OTHER PUBLICATIONS

VSpatial product website, Virtual Reality Offices, "The workspace of the Future is Here." available at https://vspatial.com, accessed Aug. 4, 2022; 5 pages.

LearnOpenGL—CSM Online Resource, "Cascaded Shadow Mapping," available at https://learnopengl.com/Guest-Articles/2021/CSM, accessed Aug. 2, 2022; 10 pages.

Wikipedia, online resource, "Shadow mapping," available at https://en.wikipedia.org/wiki/Shadow_mapping, accessed Aug. 2, 2022; 6 pages.

Wikipedia, online resource, "Volumetric lighting," available at https://en.wikipedia.org/wiki/Volumetric_lighting, accessed Aug. 2, 2022; 2 pages.

\* cited by examiner

|  | AVATAR 1102 | WALL 1109 | TABLE 1106 | AVATAR 1108 | BALL 1110 | CHAIR 1112 |
|---|---|---|---|---|---|---|
| AVATAR 1102 | ■ | ✓ | ✓ | ✓ | ✓ | ✓ |
| WALL 1109 | ✓ | ■ | ✗ | ✓ | ✗ | ✗ |
| TABLE 1106 | ✓ | ✗ | ■ | ✓ | ✗ | ✗ |
| AVATAR 1108 | ✓ | ✓ | ✓ | ■ | ✓ | ✓ |
| BALL 1110 | ✓ | ✓ | ✓ | ✓ | ■ | ✓ |
| CHAIR 1112 | ✓ | ✗ | ✓ | ✗ | ✓ | ■ |

OPTIMIZING PHYSICS FOR STATIC OBJECTS IN A THREE-DIMENSIONAL VIRTUAL ENVIRONMENT

BACKGROUND

Field

This field is generally related to computer graphics.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user's devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Many workplaces, trade shows, meetings, conferences, schools, and places of worship have closed and become available virtually. Virtual conferences using videoconferencing technology are increasingly replacing physical conferences. In addition, this technology provides advantages over physically meeting in allowing participants to avoid travel and commuting.

However, often, use of videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, due to limitations in network bandwidth and computing hardware, when a lot of streams are placed in the conference, the performance of many videoconferencing systems begins to slow down. With many schools operating entirely virtually, classes of 25 can severely slow down the school-issued computing devices. Many computing devices, while equipped to handle a video stream from a few participants, are ill-equipped to handle a video stream from a dozen or more participants.

By contrast, massively multiplayer online games (MMOG, or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate inadvertent facial expressions. These facial expressions are, however, observable in a videoconference. Some publications may describe having video placed on an avatar in a virtual world, but, these systems typically require specialized software and have other limitations that limit their usefulness.

Though some games work in virtual reality, many virtual reality engines require a large amount of computing power to render the environment realistically. Where smaller and lower end devices are used, environments may not be rendered as quickly or realistically.

Improved methods are needed to enable conferencing and VR rendering.

BRIEF SUMMARY

In an embodiment, a computer-implemented method provides for efficient simulation in a three-dimensional virtual environment including a plurality of objects. For each object in the plurality of objects, the method begins by determining whether the respective object is fixed or dynamic. For each pair of objects in the plurality of objects, the method continues by determining whether both objects in the respective pair are fixed. When both objects in the respective pair are determined to be fixed, the method concludes by disabling a simulation of physical interaction between the two objects.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 11A-B are diagrams providing an example optimization of the physics simulation in FIG. 10.

The drawing in which an element first appears is typically indicated by the leftmost digit or digits in the corresponding reference number. In the drawings, like reference numbers may indicate identical or functionally similar elements.

DETAILED DESCRIPTION

Video Conference with Avatars in a Virtual Environment

Figure 1:
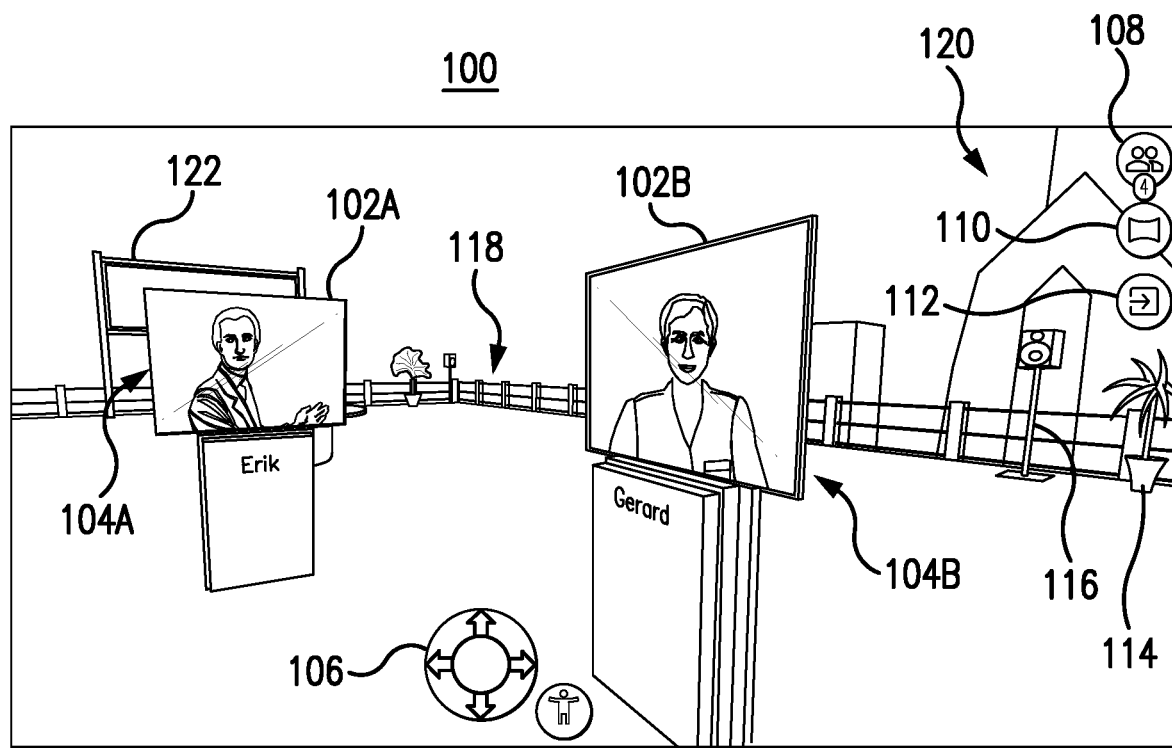
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an embodiment, different inputs may change the virtual camera's X and Y position and pan and tilt angles in the virtual environment. In further embodiments, a user may use inputs to alter height (the Z coordinate) and yaw of the virtual camera. In still further embodiments, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying details on changes in pan and tilt angles. In addition, the virtual camera may be navigated with a joystick interface 106. The joystick interface 106 may be particularly advantageous on a touchscreen display where WASD keyboard control is unavailable. Details on how the environment is updated, both in response to inputs from the user and updates in the virtual environment, are discussed below with respect to FIG. 1.

Interface 100 includes avatars 102A and B, which each represent different participants to the videoconference. Avatars 102A and B, respectively, are representations of participants to the videoconference. The representation may be a two-dimensional or three-dimensional model. The two- or three-dimensional model may have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions. These material properties are discussed in greater detail, for example, with respect to FIG. 5B. The light sources may also interact with objects in the scene to cast shadows. Examples of how shadows are cast are described, for example, with respect to FIGS. 18, 19A-B, and 20A-B.

In addition to the arena, the virtual environment can include various other three-dimensional models that illustrate different components of the environment. For example, the three-dimensional environment can include a decorative model 114, a speaker model 116, and a presentation screen model 122. Just as three-dimensional model model 118, these models can be represented using any mathematical way to represent a geometric surface in three-dimensional space. These models may be separate from three-dimensional model model 118 or combined into a single representation of the virtual environment.

Decorative models, such as decorative model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122.

Button 108 may provide a way to change the settings of the conference application. For example, button 108 may include a property to graphics quality as described below with respect to FIG. 7.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of its surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct videoconferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, embodiments provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., allowing people work "at their desks" virtually), remote control of machines (e.g. ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, means to perform underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective that a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights, etc., in your house or other location (domotics), memory palace, archaeology, gift shop, virtual visit so customers will be more comfortable on their real visit, virtual medical procedures to explain the procedures and have people feel more comfortable, virtual trading floor/financial marketplace/stock market (e.g., integrating real-time data and video feeds into the virtual world, real-time transactions and analytics), virtual location people have to go as part of their work so they will actually meet each other organically (e.g., if you want to create an invoice, it is only possible from within the virtual location), augmented reality where you project the face of the person on top of their AR headset (or helmet) so you can see their facial expressions (e.g., useful for military, law enforcement, firefighters, special ops), and making reservations (e.g., for a certain holiday home/car/etc.).

Figure 2:
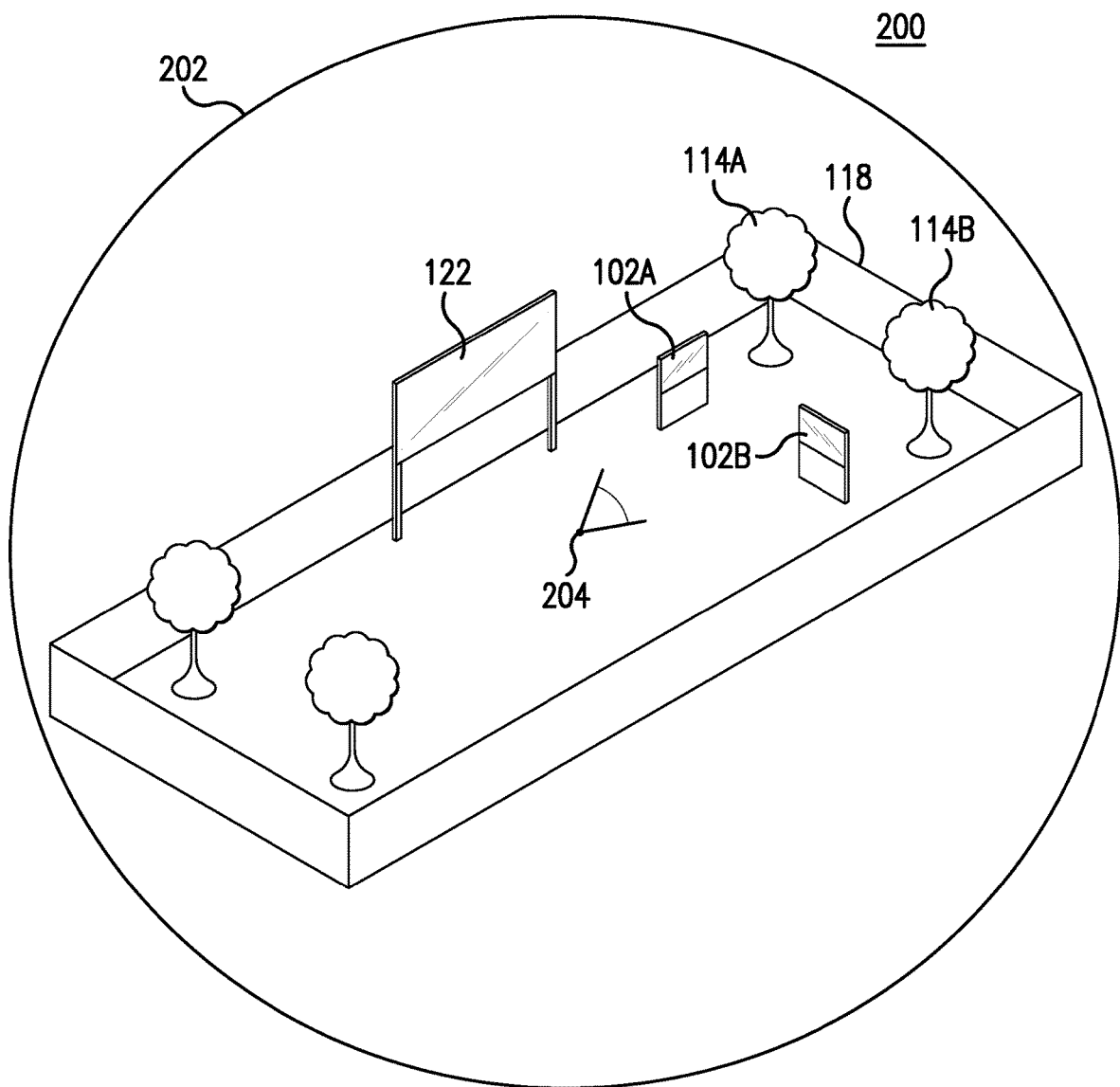
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114A-B and 122. Three-dimensional models 114A-B represent foliage, and three-dimensional model 122 represents a presentation screen. Three-dimensional models 114A-B and 122 are static in that they have a fixed position within the three dimensional model. Also as illustrated in FIG. 1, diagram 200 includes avatars 102A and B. Avatars 102A and B are dynamic in that they are free to navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within in the field of view of virtual camera 204. As described above, the field of view of virtual camera 204 may be a frustum defined, at least in part, by horizontal and vertical field of view angles.

As described above with respect to FIG. 1, a background image or texture may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other embodiments, other shapes instead of sphere 202 may be used to texture map the background image. In various alternative embodiments, the shape may be a cylinder, cube, rectangular prism, or any other three-dimensional geometry.

Figure 3:
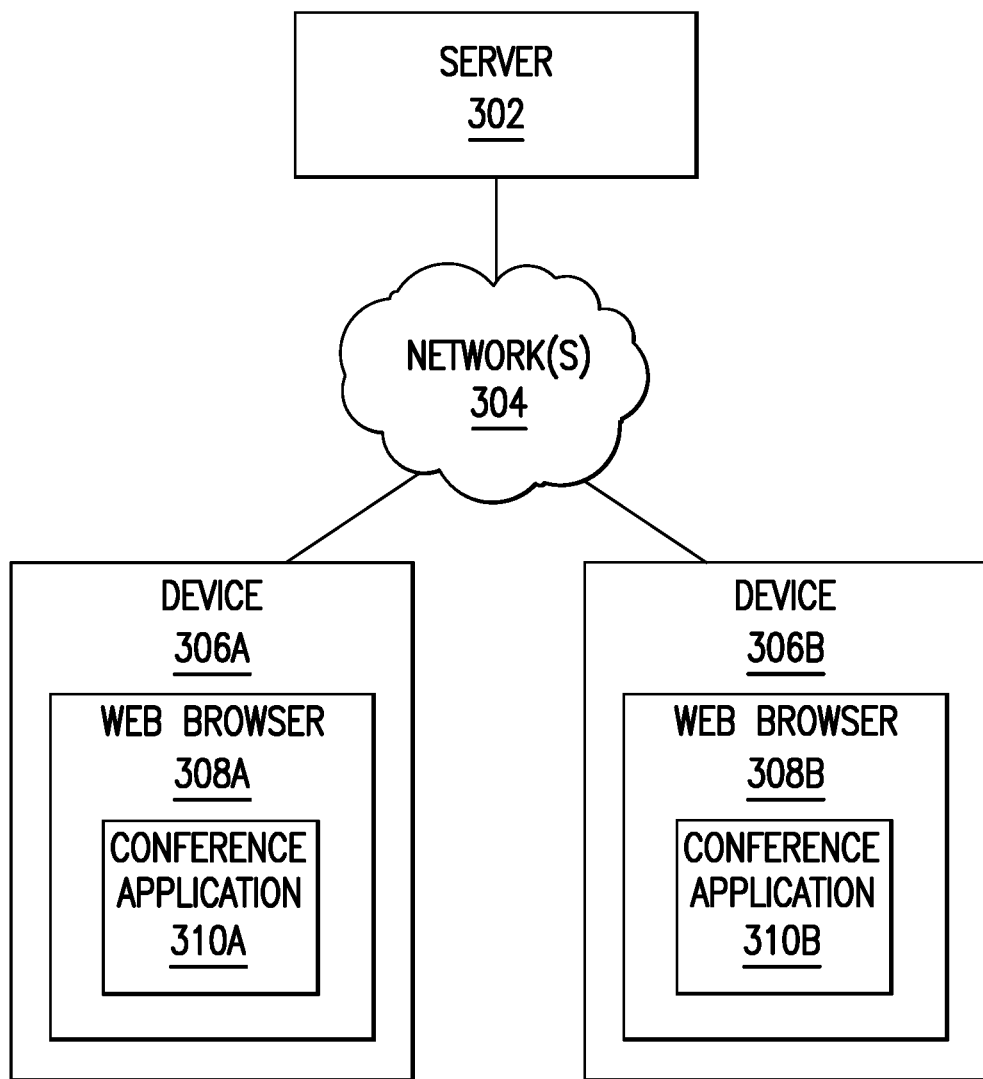
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative embodiment, communication between devices 306A-B happens not through server 302 but on a peer-to-peer basis. In that embodiment, one or more of the data describing the respective participants' location and direction, the notifications regarding new and exiting participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 308A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an embodiment, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three-dimensional modeling data, including data describing the three-dimensional virtual environment and data representing the respective participant avatars. This rendering may involve rasterization, texture mapping, ray tracing, shading, or other rendering techniques. The rendering process will be described in greater detail with effect to, for example, FIG. 9. In an embodiment, the rendering may involve ray tracing based on the characteristics of the virtual camera. Ray tracing involves generating an image by tracing a path of light as pixels in an image plane and simulating the effects of his encounters with virtual objects. In some embodiments, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
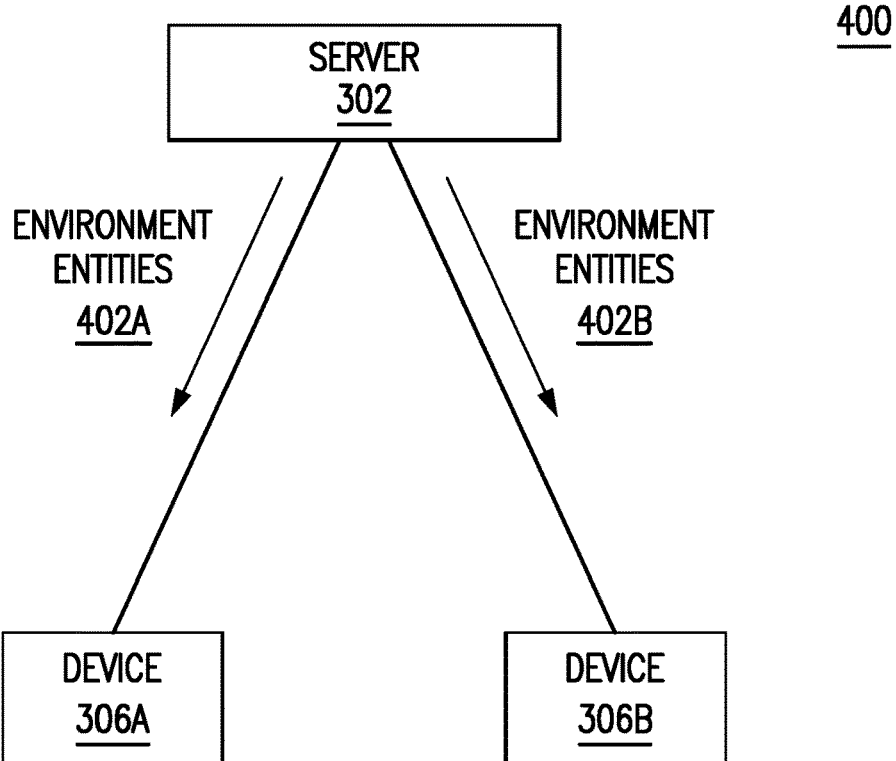
FIGS. 4A-C illustrate how data is transferred between various components of the system in FIG. 3 to provide videoconferencing.
Figure 4B:
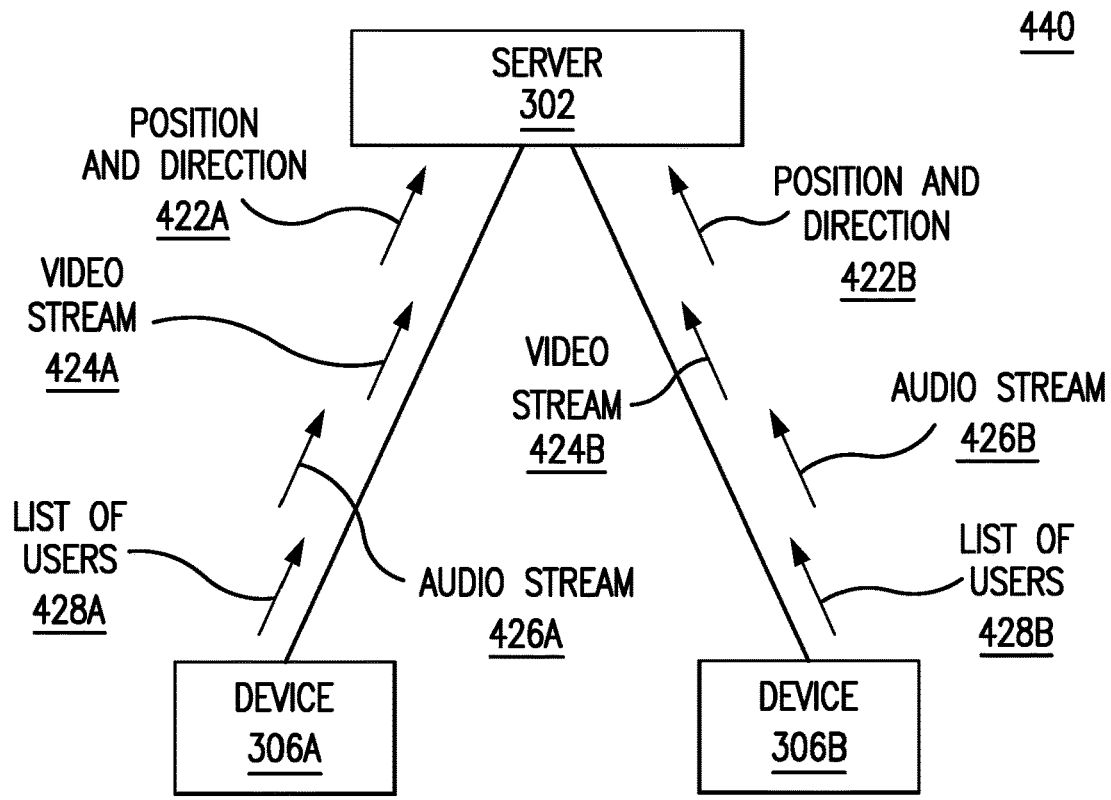
Figure 4C:
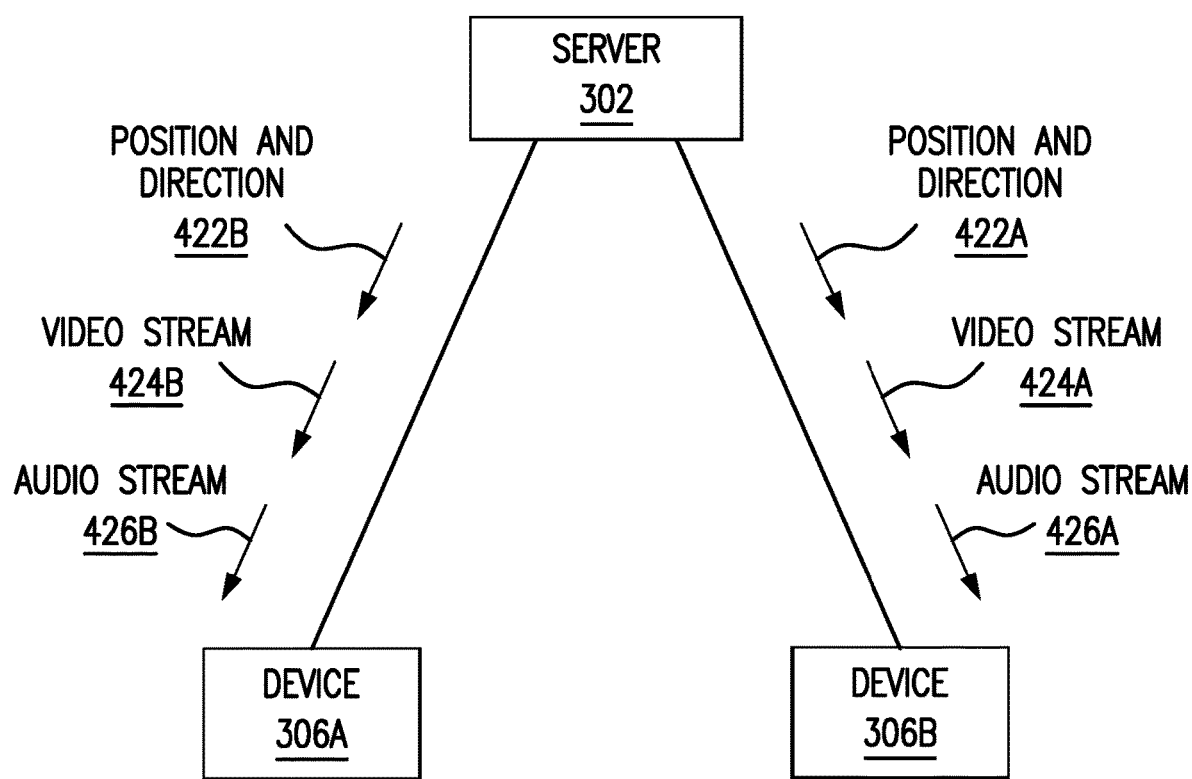

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and 306B. In particular, both devices 306A and 306B, receive from server 302 environment entities 402A and 402B respectively. Environment entities 402A-B represent a data structure describing the virtual environments to devices 306A-B. In an example, Environment entities 402A-B may describe the virtual environments in HTML using a VR framework, such as the A-Frame VR framework. A-Frame is an open-source web framework for building virtual reality (VR) experiences. A-Frame is an entity component system framework for a JavaScript rendering engine where developers can create 3D and WebVR scenes using HTML.

For example, the HTML file may reference the A-frame framework in a script element of the HTML file, and in the body element, the HTML file may reference individual entities within the VR environment. An entity represents a general-purpose object. In a game engine context, for example, every coarse game object is represented as an entity. Going back to the example in FIG. 2, each of arena 118, foliage 114A-B, presentation screen 122, avatars 102A-B, background image 202 and even virtual camera 204 may be one or more entities. Each entity may have components describing attributes of the entity. Components label an entity as possessing a particular aspect, and holds the data needed to model that aspect. More details regarding enter environment entities 402A-B are provided with respect to FIG. 6.

With the information needed to conduct the meeting sent to the participants, FIGS. 4B-C illustrate how server 302 forwards information from one device to another. FIG. 4B illustrates a diagram 440 showing how server 302 receives information from respective devices 306A and B, and FIG. 4C illustrates a diagram 460 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user using device 306A-B respectively. As described above, the position may be a coordinate in three-dimensional space (e.g., x, y, z coordinate) and the direction may be a direction in three-dimensional space (e.g., pan, tilt, roll). In some embodiments, the user may be unable to control the virtual camera's roll, so the direction may only specify pan and tilt angles.

Similarly, in some embodiments, the user may be unable to change the avatar's Z coordinate (as the avatar is bounded by virtual gravity), so the Z coordinate may be unnecessary. In this way, position and direction 422A-B each may include at least a coordinate on a horizontal plane in the three-dimensional virtual space and a pan and tilt value. Alternatively or additionally, the user may be able to "jump" its avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

While FIG. 3 and FIGS. 4A-C are illustrated with two devices for simplicity, a skilled artisan would understand that the techniques described herein can be extended to any number of devices. Also, while FIG. 3 and FIGS. 4A-C illustrate a single server 302, a skilled artisan would understand that the functionality of server 302 can be spread out among a plurality of computing devices. In an embodiment, the data transferred in FIG. 4A may come from one network address for server 302, while the data transferred in FIGS. 4B-C can be transferred to/from another network address for server 302.

Initiating the Conference Application

Figure 5A:
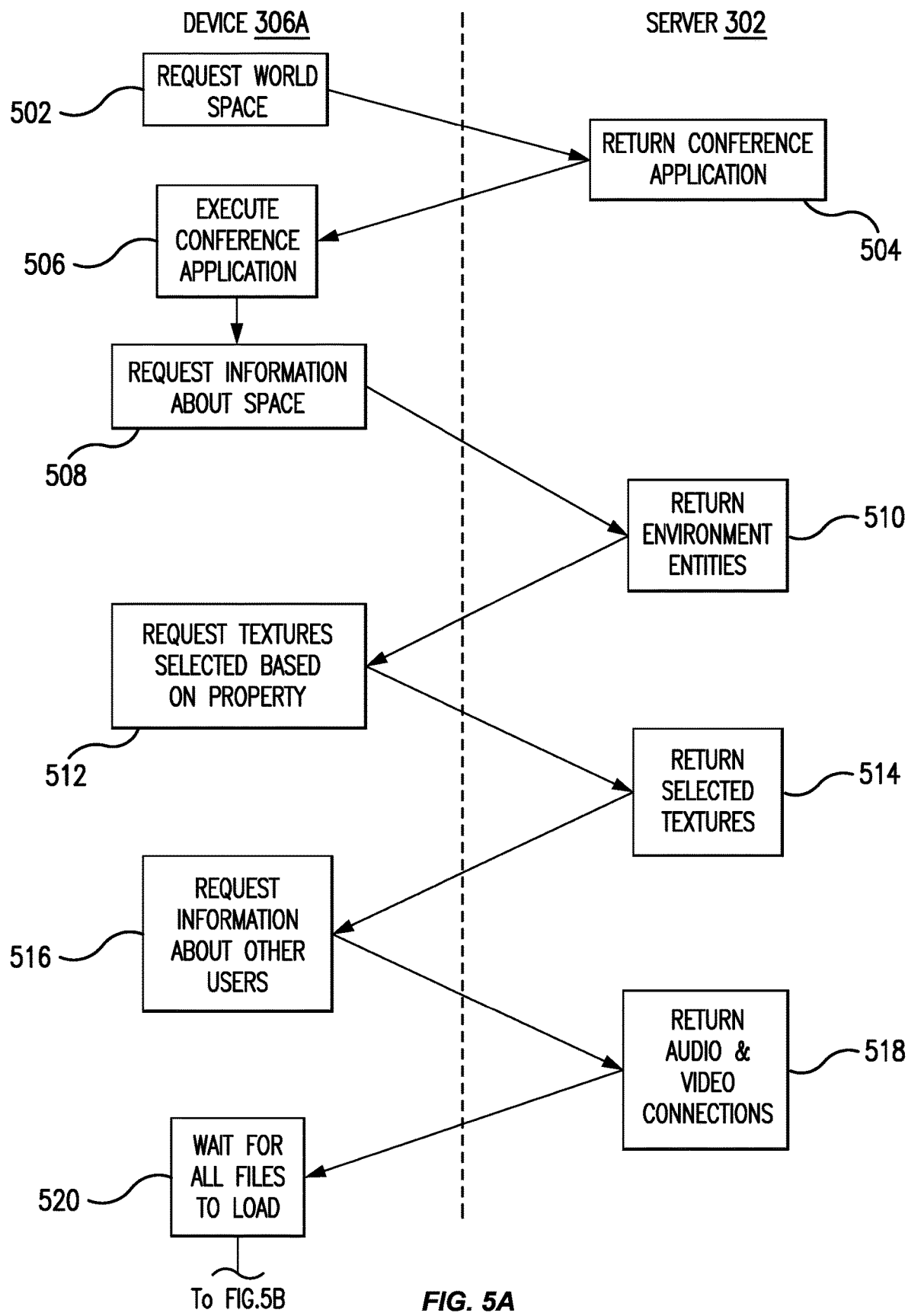
FIGS. 5A-B are flowcharts illustrating a method for initiating a videoconference application in a virtual environment and beginning a rendering loop.
Figure 5B:
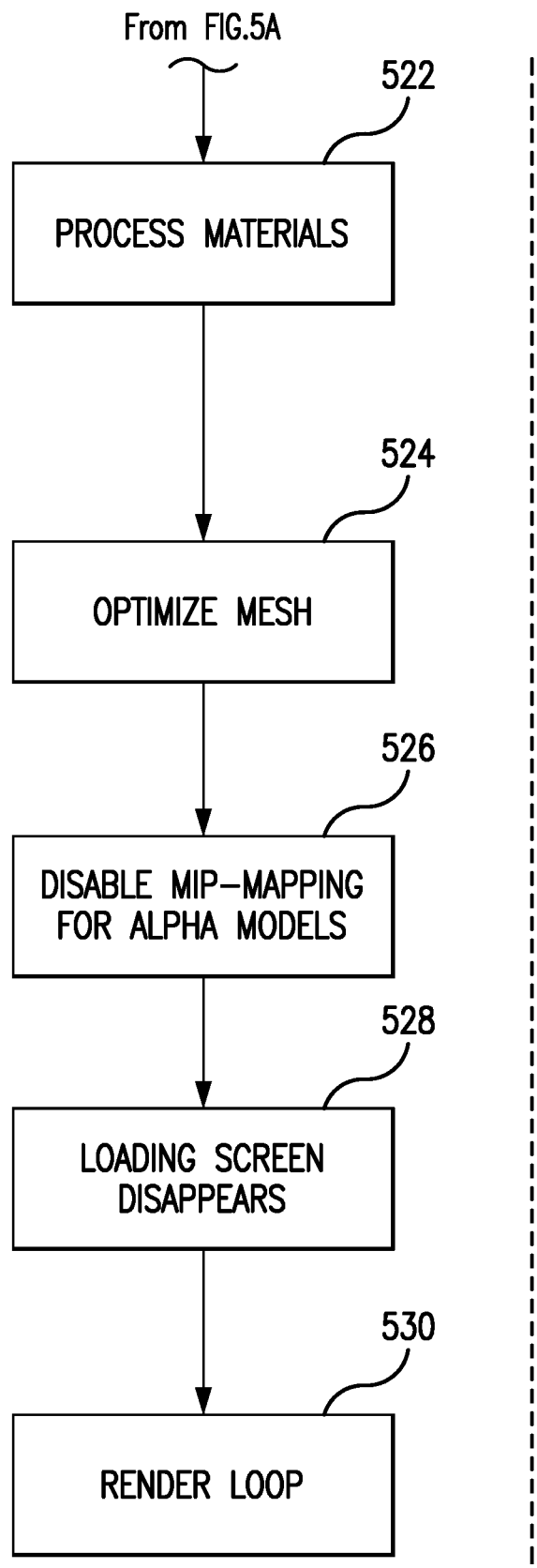

FIGS. 5A-B are flowcharts illustrating a method for initiating a videoconference application in a virtual environment and beginning a rendering loop.

At step 502, device 306A requests a world space from server 302. In one embodiment, a user may first login by entering credentials on a login page. After submitting the credentials and authenticating the user, the server may return a page that lists available worlds that the user is authorized to enter. For example, there may be different workspaces or different floors within a workspace. In one embodiment, participants can set their webcam, microphone, speakers and graphical settings before entering the virtual conference.

At 504, server 302 returns the conference application to device 306A. In an embodiment, once the user selects a world to enter, server 302 will return a conference application to device 306A for execution. As described above, the conference application may be a software application configured to run within a web browser. For example, the conference application may be a JavaScript application. The conference application may include the instructions needed for the web browser within device 306A to execute the virtual conference application. More detail on the conference applications provided below for example with respect to FIG. 25.

At 506, device 306A starts executing the conference application. As mentioned above, the conference application may be a JavaScript application. To execute the JavaScript application, device 306a may use a JavaScript engine within its web browser to execute the conference application. An example of such a JavaScript engine is the V8 JavaScript engine available from Alphabet Inc. of Mountain View, California.

At 508, device 306A requests information specifying the three-dimensional space from server 302. This may involve making HTTP/HTTPS requests to server 302.

At 510, server 302 returns environment entities to device 306A. As mentioned above, the environment entities specifying the three-dimensional space may, for example, include an A-frame HTML file. In example is described in greater detail with respect to FIG. 6.

Figure 6:
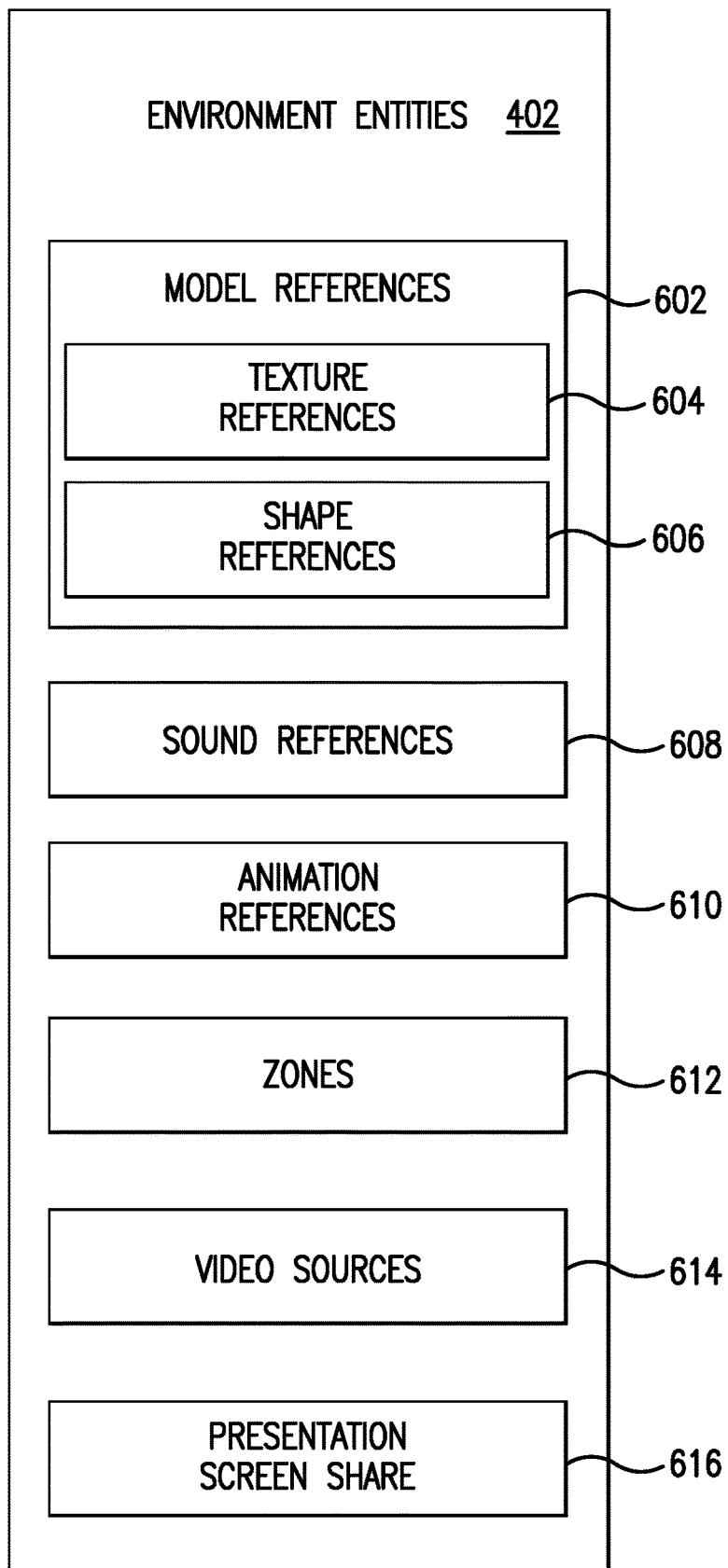
FIG. 6 is a diagram illustrating a data structure for representing environment entities.

FIG. 6 is a diagram illustrating a data structure 402 for representing environment entities. Data structure 402 may follow an Entity-Component-System (ECS) architectural pattern. ECS follows the composition over the inheritance principle, which offers better flexibility and helps identify entities where each object in a three-dimensional scene are considered an entity. The entities may be structured as a tree with each entity inheriting properties of the entity above it.

A component is a singular behavior ascribed to an entity. A composition is an element that could be attached more components to add additional appearance, behavior, or functionality. You can also update the component values to configure the entity. The name of an element should ideally communicate what behavior the entity will exhibit. A system will iterate many components to perform low-level functions such as rendering graphics, performing physics calculations or pathfinding. It offers global scope, management, and services for classes of components. Examples of the system include gravity, adding velocity to position, and animations.

Data structure 402 includes model references 602, sound references 608, animation references 610, zone 612, video sources 614, and presentation screen share 616.

Model references 602 each specify a model in three-dimensional space. Turning to the example provided in FIG. 2, the depicted virtual environment includes three-dimensional arena 118; various three-dimensional models, including three-dimensional models 114A-B of foliage and three-dimensional model 122 of a presentation screen; and three-dimensional models 102A-B of avatars. Model references 602 may specify each of these. Each of model references 602 may include at least one texture reference 604 and shape reference 606.

As described above, background texture 120 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 118 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Three-dimensional model 602 is any other three-dimensional modeling information needed to conduct the conference. In one embodiment, this may include information describing the respective avatars. Alternatively or additionally, this information may include product demonstrations.

Texture references 604 references a graphical image that is used to texture map onto a three dimensional model. Each of texture references 604 may include a uniform resource locator (URL) that indicates where to retrieve the associated texture. The graphical image may be applied (mapped) to the surface of a shape. It may be stored in common image file formats and may be stored in swizzle or tiled orderings to improve memory utilization. They may have RGB color data and they also may have alpha blending. Alpha blending adds an additional channel to specify transparency. This may be particularly useful when a three-dimensional article is represented by two-dimensional shapes. For example, foliage, such as the foliage 114A and 114B, may be defined using alpha modeling, with the shape of each leaf being defined using the alpha channel.

As will be described below in greater detail with respect to FIG. 7, each image may be specified by multiple texture references 604, with each texture reference 604 referencing an image at a different resolution. In this way, embodiments can select a texture resolution to use enabling the environment to be adapted to execute on computing devices of different operating powers. Texture references 604 may also include references to materials. Materials define the optical properties of an object for example, how it's color, dullness, or shininess are affected.

Shape references 606 defined three-dimensional shapes. Each of shape references 606 may include a uniform resource locator (URL) that indicates where to retrieve the associated three-dimensional shape. For example, the three-dimensional shape may represent three-dimensional meshes, voxels or any other techniques.

Animation references 610 may reference animations to play within the three-dimensional environment. The animation may describe motion over time.

Zones 612 represent areas within the three-dimensional environment. The areas can be used for example to ensure sound privacy. Zones 612 are data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Video sources 614 represent sources of video to present within three dimensional environment. For example, as described above, each avatar may have a corresponding video that is captured of the user controlling the avatar. That video may be transmitted using WebRTC or other known techniques. Video sources 614 describe connection information for the video (including the associated audio).

Presentation screen share 616 describe sources of screen share streams to present within a three dimensional environment. As described above, users can share their screens within the three-dimensional environment and the streaming screen shares can be texture mapped onto models within the three dimensional environment.

Returning to FIG. 5, once server 302 returns environment entities to device 306A at 510, device 306A requests textures selected based on a property from server 302 at 512. For each texture in the virtual environment, server 302 may include multiple versions representing the same image at different resolutions. When a texture is uploaded to a repository on server 302, images for the texture are precomputed and stored at the repository. In particular, whenever an image is received to use as a texture for a three-dimensional model, the image is converted to at least one lower quality. The lower qualities may be 12.5%, 25%, and 50% of the original or maximum 100% resolution. In alternative or additional embodiments, different quality models or sounds may be selected based on property.

As mentioned above, the environment entities downloaded may have multiple references to the same texture, but at different resolutions. The user may have a setting to select which resolution textures to request. Alternatively or additionally, the resolution requested may depend on a distance from the virtual camera. Lower quality textures may be loaded for objects that are more distant in higher quality textures may be loaded for objects that are closer to the virtual camera.

Figure 7:
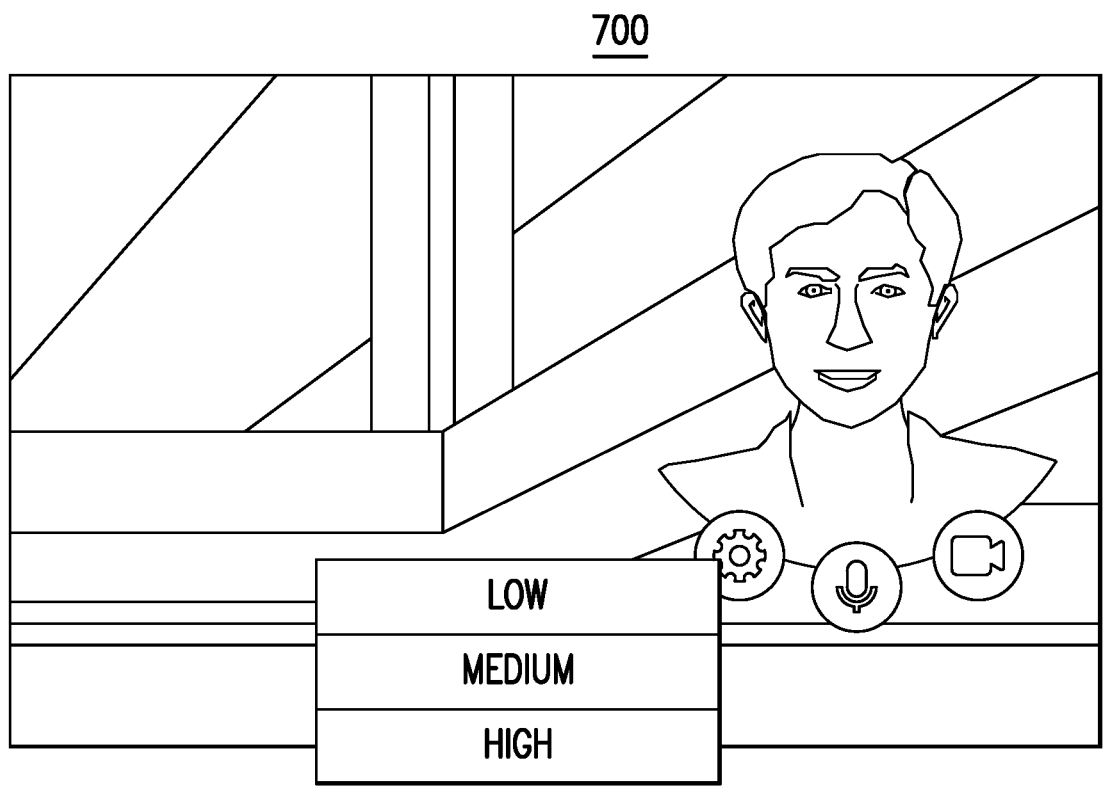
FIG. 7 is a screenshot illustrating a user interface for selecting a property to adjust graphics quality.

FIG. 7 is a screenshot illustrating a user interface 700 for selecting a property to adjust graphics quality. As shown in FIG. 7, user interface user interface 700 includes a menu 702 with different quality levels to select. This sets a property on the client device that the conference application uses to determine which quality texture to request.

In an embodiment, the property setting is lower when the request is send from a device with a smaller screen. In this embodiment, the conference application can determine a screen size of the device and select a quality property to request a texture resolution based on the screen size of device 306A. Additionally or alternatively, the property setting is lower when the request is send from a device with lower processing power. In this embodiment, the conference application can determine an available processing power of the device and select a quality property to request a texture resolution based on the screen size of device 306A.

In this way, at 512, device 306A requests a texture selected based on a property of the conference application. The request indicates a level of resolution requested, wherein the property setting selects one of several possible levels of resolution.

In an embodiment, the downgraded image is rendered with different materials based on the property setting. With a lower quality setting, the downgraded image may be rendered with a simplified material that requires less processing power to render. For example the simplified material may lack physically-based rendering (e.g., metalness) and require fewer calculations for rendering the material properties. For example, the simplified material may exhibit Lambertian reflectance. If a higher quality is selected, the physically-based rendering may be selected instead.

At 514, server 302 returns selected textures to device 306A. When the highest quality setting is not used, server 302 receives, from a client device, a request for the downgraded image. In response to the request for the image, server 302 sends the image to the client to texture map onto the three dimensional model for presentation within a three-dimensional environment.

At 516, device 306A requests information about other users. In particular, device 306A requests audio and video streams of other users.

At 518, server 302 returns audio and video connections for the other users.

At 520, device 306A waits for all files to load. During this period, all the requested files describing the three-dimensional environment are loaded from server 302. While the files are being noted a loading screen may be presented to a user.

Once all the files are load, device 306 conducts certain optimizations on the environment entities to enable them to be rendered more efficiently. Device 306A processes materials at 522 and optimizes meshes at 524. Steps 522 and 524 are described in greater detail with respect to FIG. 8.

At 526, device 306A disables mipmapping for textures that use alpha testing. In computer graphics, mipmaps (also MIP maps) or pyramids are pre-calculated, optimized sequences of images, each of which is a progressively lower resolution representation of the previous. The height and width of each image, or level, in the mipmap is a factor of two smaller than the previous level. They are intended to increase rendering speed and reduce aliasing artifacts. Mipmapping is a more efficient way of downfiltering (minifying) a texture; rather than sampling all texels in the original texture that would contribute to a screen pixel, it is faster to take a constant number of samples from the appropriately downfiltered textures. By default, the conference application may enable mipmapping for textures on models in the three-dimensional environment.

As mentioned above, some textures have an alpha channel. In fact, some models in the three-dimensional environment may only have two dimensions and be defined entirely by the alpha channel of the texture. This is particular useful for models of foliage, but may also be used for models of things like fences. For these alpha map models, their shape on a two-dimensional plane in the three-dimensional environment is defined by a texture that indicates whether each position on the two-dimensional plane is transparent and opaque. For example, each pixel may be a one or zero depending on whether that pixel is transparent or opaque.

Because the shape of the alpha map models are specified by the texture, mipmapping these textures results in a changing shape. However, this changing shape could lead to problematic artifacts when calculating shadows. In an example, as the graphics card generates a lower resolution texture, leaves disappear. However, as will be discussed in greater detail below with respect to shadow generation, the shadow may remain. At least in part to deal this issue, according to an embodiment, mipmapping is disabled for alpha map models at 526.

At 528, device 306A disables the loading screen.

At 530, device 306A enters a render loop. The render loop will be described in greater detail with respect to FIG. 9. As described above, the conference application may periodically or intermittently re-render the virtual space based on new information from respective video streams, position and direction of the virtual camera or avatars, and new information relating to the three-dimensional environment.

As device 306A receives the video stream, the device texture maps frames from video stream on to an avatar corresponding to device 306A. That texture mapped avatar is re-rendered within the three-dimensional virtual space and presented to a user of device 306A.

As device 306A receives a new position and direction information from other devices, device 306A generates the avatar corresponding to device 306B positioned at the new position and oriented at the new direction. The generated avatar is re-rendered within the three-dimensional virtual space and presented to the user of device 306A.

When another user exits the virtual conference, server 302 sends a notification to device 306A indicating that the other user is no longer participating in the conference. In that case, device 306A would re-render the virtual environment without the avatar for the other user.

In some embodiments, server 302 may send updated model information describing the three-dimensional virtual environment. When that happens, device 306A will re-render the virtual environment based on the updated information. This may be useful when the environment changes over time. For example, an outdoor event may change from daylight to dusk as the event progresses.

Entity and Scene Graph Optimizations

Figure 8:
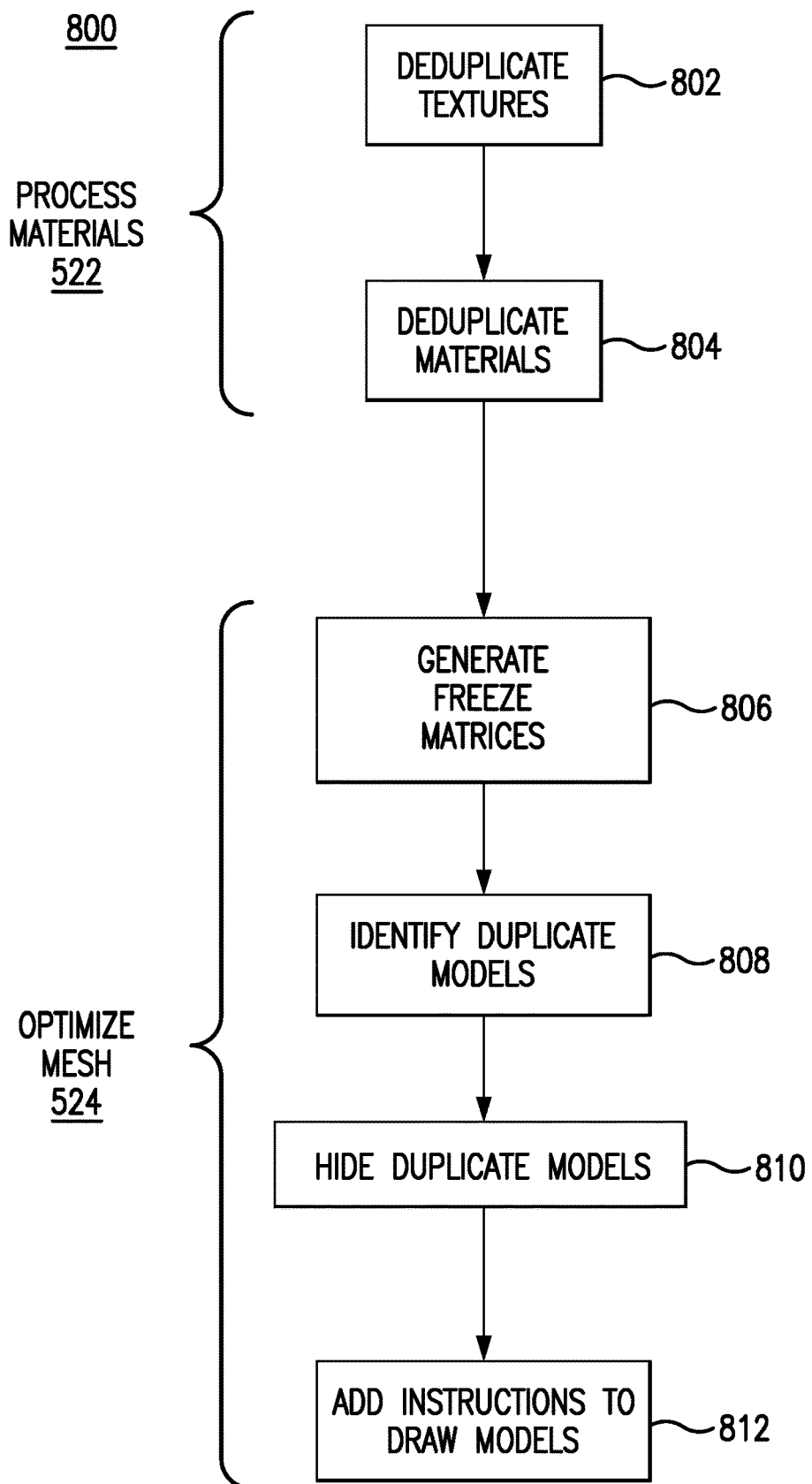
FIG. 8 is a flowchart illustrating a method for processing materials and optimizing a mesh according to an embodiment.

FIG. 8 is a flowchart illustrating a method 800 for processing materials and optimizing a mesh according to an embodiment. As mentioned above, the data structure representing the 3D three-dimensional virtual environment that the client 306A receives from server 302 may be represented in a VR language. In an embodiment, the data structure may be represented in an ECS language. In one example, the data structure may be represented in A-frame.

Before passing to the rendering engine, the VR framework data structure received from server 302 may need to be converted into a scene graph that is can be processed by the rendering engine. A scene graph is a general data structure commonly used by vector-based graphics editing applications and modern computer games, which arranges the logical and often spatial representation of a graphical scene. It is a collection of nodes in a graph or tree structure. A scene may be is a hierarchy of nodes in a graph where each node represents a local space. An operation performed on a parent node automatically propagates its effect to all of its children, its children's children, and so on. Each leaf node in a scene graph may represents some atomic unit of the document, usually a shape such as an ellipse or Bezier path.

Method 800 may include optimizations that occur when converting the VR framework file, such as an A-frame file, into a scene graph.

At 802, conference application 310 deduplicates textures. Conference application 310 may identify those textures in the environment entities 402 that are identical to one another. To identify they are identical to one another, conference application 310 may determine that the images are the same and properties associated with the image are also the same. Properties include, for example, whether mipmapping is enabled and any values indicating whether the texture is repeated, rotated, or offset, indicating how the texture can be sampled, etc. When two or more textures are identified as identical in the VR framework, only a single node representing the texture may be used in the scene graph.

At 804, conference application 310 deduplicates materials in a similar manner to its de-duplication of materials. Conference application 310 may identify those materials in the environment entities 402 that are identical to one another. To identify they are identical to one another, conference application 310 may determine that they specify the same operations to perform when exposed to light. For example, some materials, like a piece of chalk, are dull and disperse reflected light about equally in all directions; others, like a mirror, reflect light only in certain directions relative to the viewer in light source. Other materials have some degree of transparency, allowing some amount of light to pass through. When two or more materials are identified as identical in the VR framework, only a single node representing the texture may be used in the scene graph.

Alternatively or additionally, textures or materials may be merged when we determine they are 'close enough.' For example, if two textures or materials are similar enough (which can be determined using, for example, computer vision techniques), either only one is used or a new extra material that is in-between the two is determined. The new material may be determined by, for example, averaging the properties that are different or through use of an algorithm to find a new variant that will work for all uses. Subsequently, this merged texture material is deduplicated.

In addition to or alternatively from textures and materials, in various embodiments, shapes may deduplicated as well. Identical shapes may be determined and de-duplicated. As described above, in situations where shapes are similar, shapes may be merged into a new average shape, and that new average shape may be de-duplicated. Alternatively or additionally two or more dissimilar meshes that have the same material may be merged into a single new mesh having that material. This may be done by calculating the relative positions of the vertices of the different meshes and appending those into a new list of vertices. The lists of triangles may be combined by using degenerate triangles in order to prevent a visible connection between the different meshes.

At 806, conference application 310 generates freeze matrices. As described above, the scene graph be structured as a tree of individual nodes. A parent node has children and those child nodes may have their own children. A node that has no children is a leaf node; the leaf node may represent an atomic object within the rendering and engine. Leaf and non-leaf nodes may represent a shape or geometric primitive. In an example, a node may have a chair node as its child. The child node may have legs, a seat and a back, each as child nodes.

Figure 11A:
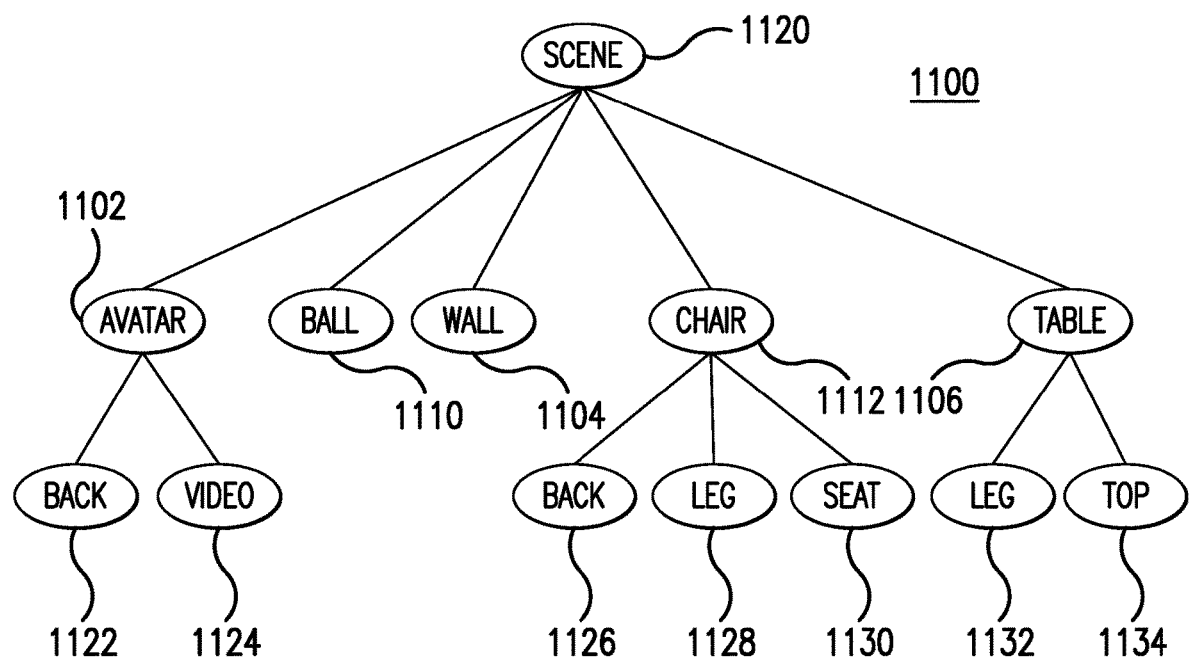

An example is illustrated in FIG. 11A. FIG. 11A illustrates a scene graph 1100. At its root is scene 1120. Scene 1120 has five child nodes: avatar 1102, ball 1110, wall 1104, chair 1112, and table 1106. Ball 1110 and wall 1104 may be leaf nodes, while avatar 1102, chair 1112, and table 1106 have children. Avatar 1102 has two children: back 1122 and video 1124 (representing where the video is rendered). Chair 1112 has three children: back 1126, leg 1128, and seat 1130. Table 1106 has two children: leg 1132 and top 1134. In an additional example (not shown), the same chair 1112 appears multiple times around a table, and chair 1112 model may be de-duplicated.

At step 806, a data structure is assembled that identifies the nodes which only have children (and sub-children) that are fixed to the respective node. In the example in FIG. 11A, scene 1120 has items within it that move, such as avatar 1102 and ball 1110. Thus, scene 1120 cannot be labeled as fixed. However, each of the child nodes can be labeled as fixed. Avatar 1102 can move within a scene. But each of its children, back 1122 and video 1124, only move if avatar 1102 moves. As will be described later, this freeze matrix generated in step 806 can be used to make transformations and animations more efficient. At steps 808-812, conference application 310 automatically instances models.

Looking to the example in FIG. 11A, tables and chairs typically have four legs. In the VR framework file, chair 1112 and table 1106 may include four separate leg models, each leg model represented by a different primitive.

At step 808, conference application 310 identifies duplicate models, such as duplicate leg primitives for chair 1112 and table 1106. In particular, conference application 310 may evaluate models referenced in the VR framework file and determine that the objects referenced in the VR framework file includes a group of repeating, identical three dimensional models in the three dimensional environment.

At 810, conference application 310 hides the duplicate models. Conference application 310 may, for example, change a property corresponding to the object in the scene graph to indicate to the rendering engine not to render the duplicate models. In the example in FIG. 11A, (though they are not separated in this figure for simplicity), the four separate legs for chair 1112 and the four separate legs for table 1106 may still be present in the scene graph, but they are marked to indicate to the rendering engine not to render those objects.

At 812, conference application 310 adds a single instruction to draw the duplicate models. In particular, conference application 310 generates a single instruction specifying a rendering engine to render the repeating, identical three dimensional models in the three dimensional environment. Each of these single instructions will result in a single draw call to the rendering engine in a web browser. Each single instruction indicates to the rendering engine to rasterize the plurality of the group of duplicate objects. In the example of FIG. 11, there would be one instruction for the four legs of chair 1112 and one instruction for the four legs of table 1106. In the figure, the four legs of chair 1112 are represented by a single leg 1128, and the four legs of table 1106 are represented by a single leg 1132.

Rendering Loop

Figure 9:
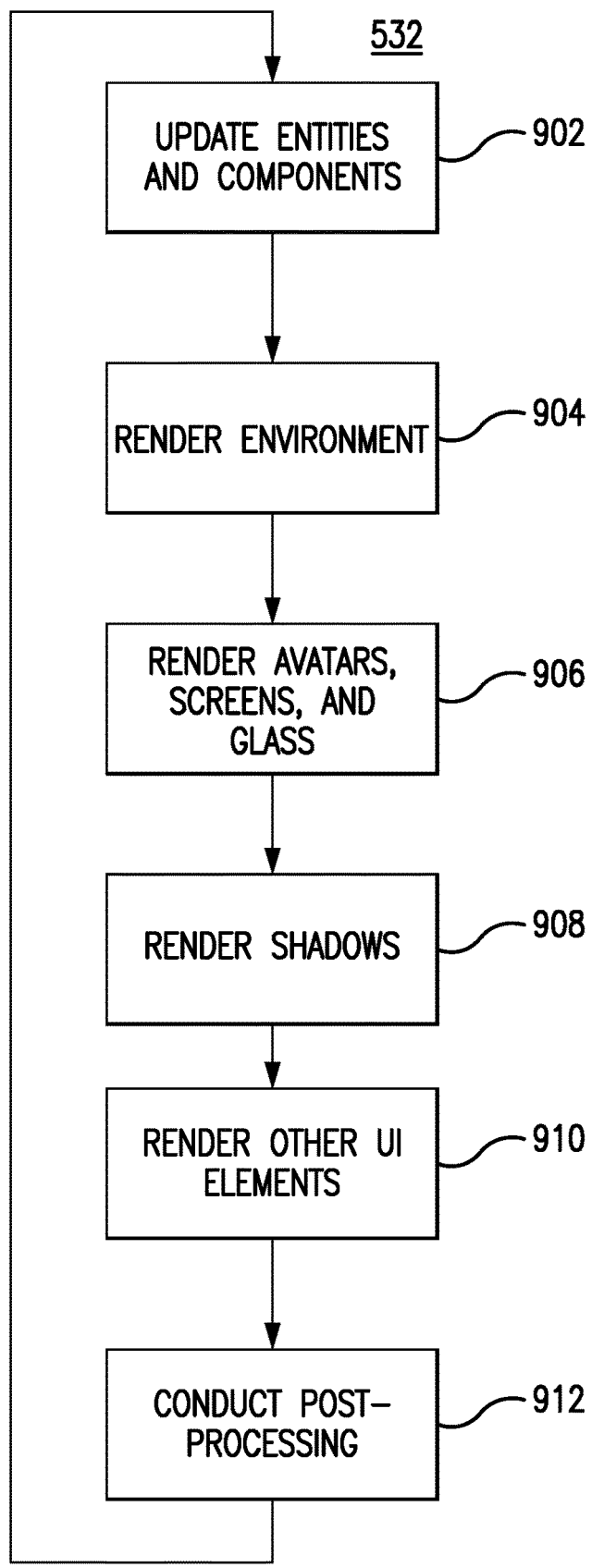
FIG. 9 is a flowchart illustrating a rendering loop for a virtual reality conferencing application.

FIG. 9 is a flowchart illustrating a rendering loop 532 for a virtual reality conferencing application. While rendering loop 532 illustrates a particular sequence of steps, any sequence is possible in various embodiments. In addition, steps may be done in parallel. For example, shadow maps (which will be described in greater detail) may be rendered in parallel with images being rendered.

At 902, conference application 310 updates entities and components. This may be done in a tick or tock function. The updating may involve translations, resizing, animation, rotation, or any other alterations to entities and components within the three dimensional environment. In particular, at 902, conference application 310 evaluates whether a position, rotation or scale of an object of represented by each respective node in a tree hierarchy needs to be updated. Conference application 910 traverses the tree hierarchy to make the determination for the respective nodes. When the position, rotation and scale of an object needs to be updated, conference application 310 transforms the object.

As described above, freeze matrices determined in FIG. 8 at step 806 may be used to improve speed of step. In particular, conference application 310 determines whether an object is labeled as fixed. To make the determination, conference application 310 may look up the object in the freeze matrix previously determined at step 806. When determining whether the object is not labeled as fixed, conference application 310 may evaluate children of the respective node. And when determining whether the object is labeled as fixed and that the position, rotation and scale of the object do not need to be updated, conference application 310 halts further consideration children of the respective node.

When the conference application transforms an object, there may then be a need to determine how the objects interact with one another. For example, an avatar may run into a wall, stopping its motion. Physics simulation is needed to detect and implement these interactions.

Figure 10:
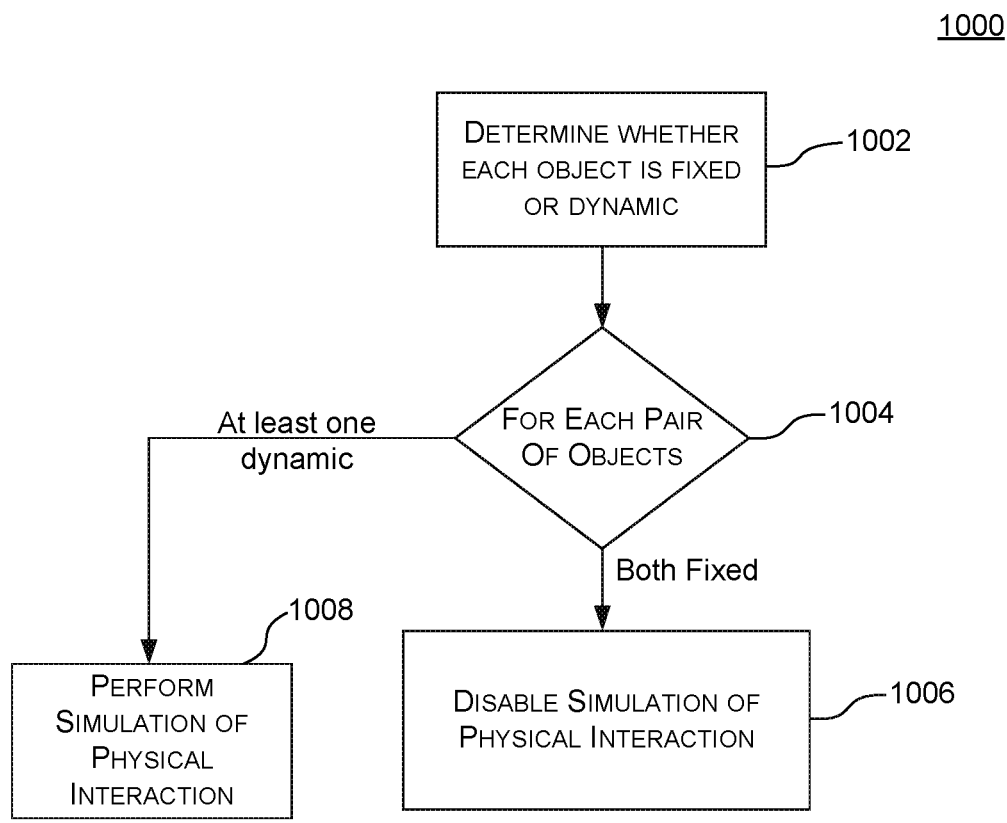
FIG. 10 is a flowchart illustrating a method for optimizing physics simulation in the virtual environment.

FIG. 10 is a flowchart illustrating a method 1000 for optimizing physics simulation in the virtual environment.

At 1002, conference application 310 determines whether an object is fixed (i.e. static) or dynamic. Static objects are objects that are stationary at fixed positions within the three-dimensional environment. In contrast, dynamic objects are objects that move within the environment.

FIG. 11A is a diagram 1100 with a chart listing five example objects—avatar 1102, wall 1104, table 1106, ball 1110, and chair 1112. In this example, the models representing parts of the structure and furniture—wall 1104, table 1106, and chair 1112—are static. They are at fixed positions within the three dimensional environment and, within the conferencing application, cannot move, transform, or otherwise rotate.

In contrast, avatar 1102, avatar 1108, and ball 1110 are dynamic objects. Avatar 1102 and avatar 1108 can be moved in response to input from a user. Each of avatar 1102 and avatar 1108 may be used to navigate the environment by a participant to the conference and represent a position and orientation of the participant's virtual camera. Ball 1110 may be a dynamic object; when another object hits it, it may maintain forward momentum for at least some period of time until its simulated energy dissipates.

At step 1004, conference application 310 identifies pairs of objects at 1004 and at 1006, conference application 310 determines whether both objects in the pair are fixed. When both are fixed, physics simulation between the objects is disabled and processing speed is improved. FIG. 11B is a diagram 1150 providing an example optimization of the physics simulation in FIG. 10. Diagram 1150 is a table with the six example objects— avatar 1102, wall 1109, table 1106, avatar 1108, ball 1110, and chair 1112—listed on the respective rows and columns. Each cell indicates whether at least one of the pair of objects represented by the cell is dynamic. When at least one is dynamic, the cell has a check, indicating that physics simulation is needed to determine whether a collision occurs between the two objects. When both are fixed, the cell has an X, indicating that both are fixed and therefore no there is no need for physics simulation to occur.

In this way, for each object in the plurality of objects, conference application 310 determines whether the respective object is fixed or dynamic. And, for each pair of objects, conference application 310 determines whether both objects in the respective pair are fixed. When both objects in the respective pair are determined to be fixed, conference application 310 disables a simulation of physical interaction between the two objects at step 1006.

When at least one object in the respective pair is determined to be dynamic, at step 1008, conference application 310 conducts a simulation of physical interaction between the two objects to determine whether a collision occurs between the objects in the respective pair. When the collision is determined to occur, conference application 310 prevents the objects in the respective pair from penetrating one another.

Turning back to FIG. 9, once the entities and components are updated at step 902, at 904, conference application 310 renders the environment. And, at 906, conference application 310 renders avatars, screens, and glass. Steps 904 and 906 are described in greater detail with respect to FIGS. 12-17.

Figure 12:
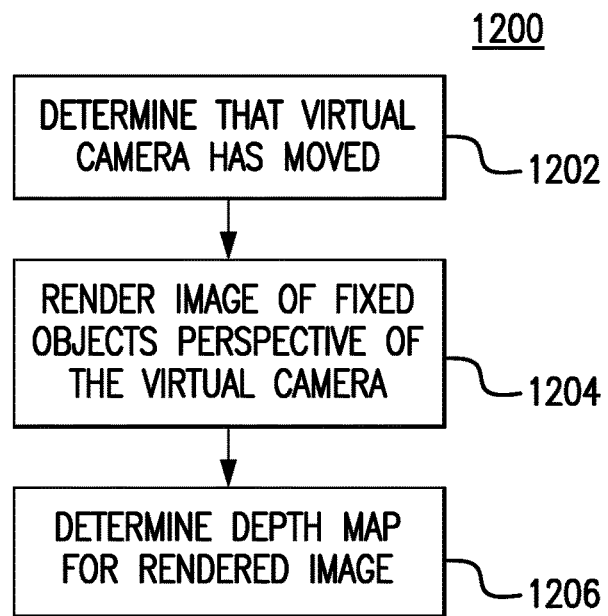
FIG. 12 is a flowchart illustrating a method rendering a fixed background image and accompanying occlusion map.

FIG. 12 is a flowchart illustrating a method rendering a fixed background image and accompanying occlusion map.

At 1202, the conference application determines that the virtual camera is moved since the last time it has captured a fixed image. In particular, conference application 310 determines whether a virtual camera has been still or has moved. In one embodiment, step 1202 may be triggered whenever the virtual camera has moved to a new location or has rotated to a new orientation. In another embodiment, step 1202 may be triggered when the virtual camera has moved to a new location and been still for a period of time. As mentioned above, the virtual camera specifies a perspective to render the three-dimensional environment. The three-dimensional environment includes fixed objects (such as the building and furniture) and dynamic objects (such as other avatars).

Figure 13:
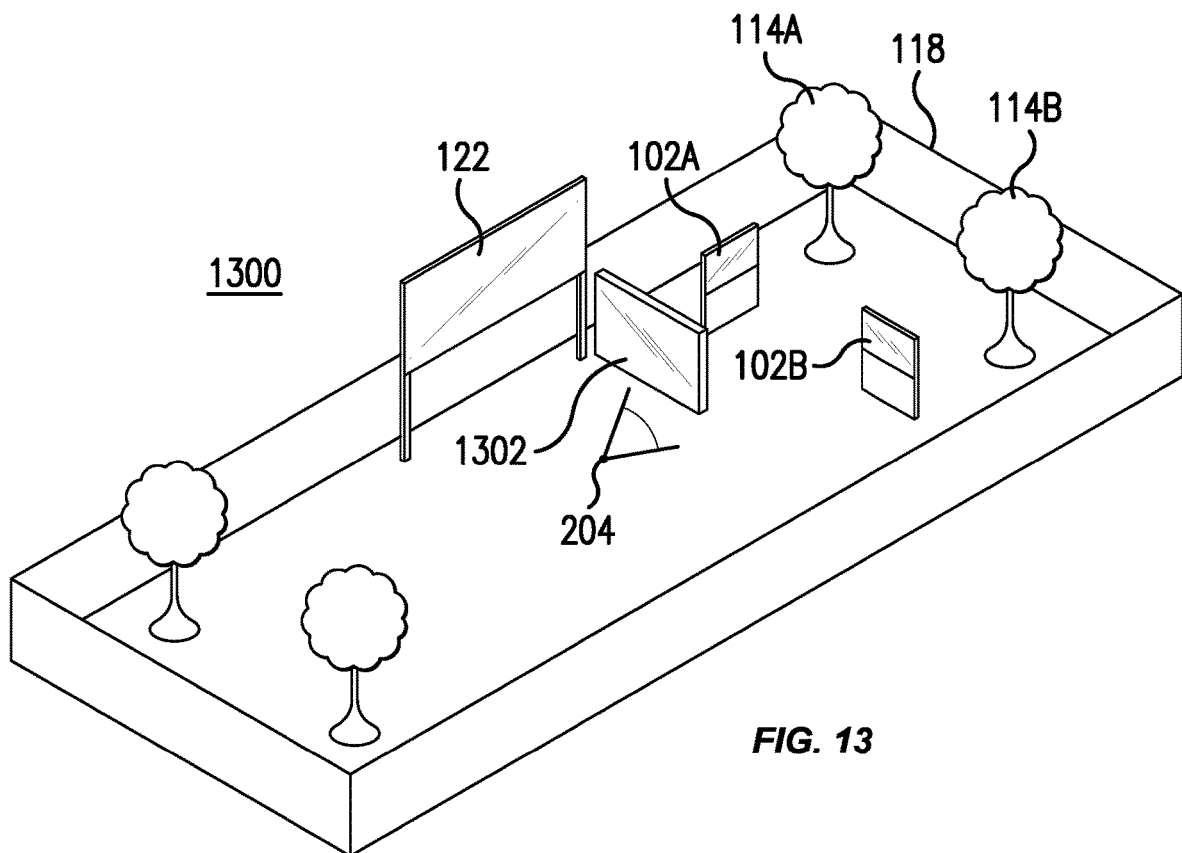
FIG. 13 is a diagram illustrating an example environment where a virtual camera captures a background image and occlusion map.

FIG. 13 is a diagram 1300 illustrating an example environment. The example environment shows the entities in diagram 200: arena 118, presentation screen 122, foliage 114A and 114B, and avatars 102A and 102B. Though not shown, the environment may also include a background texture, such as texture 202. In addition, diagram 1300 includes a wall 1302. The environment is captured from the perspective of virtual camera 204 that is navigable by a user of conference application 310.

In the example in diagram 1300, arena 118, presentation screen 122, foliage 114A and 114B, and texture 202 (not shown) may be fixed objects in that they have fixed positions within the environment. In contrast, avatars 102A and 102B are dynamic objects in that their positions within the environment can move over time, such as in response to inputs from the respective users that those avatars represent.

Figure 14:
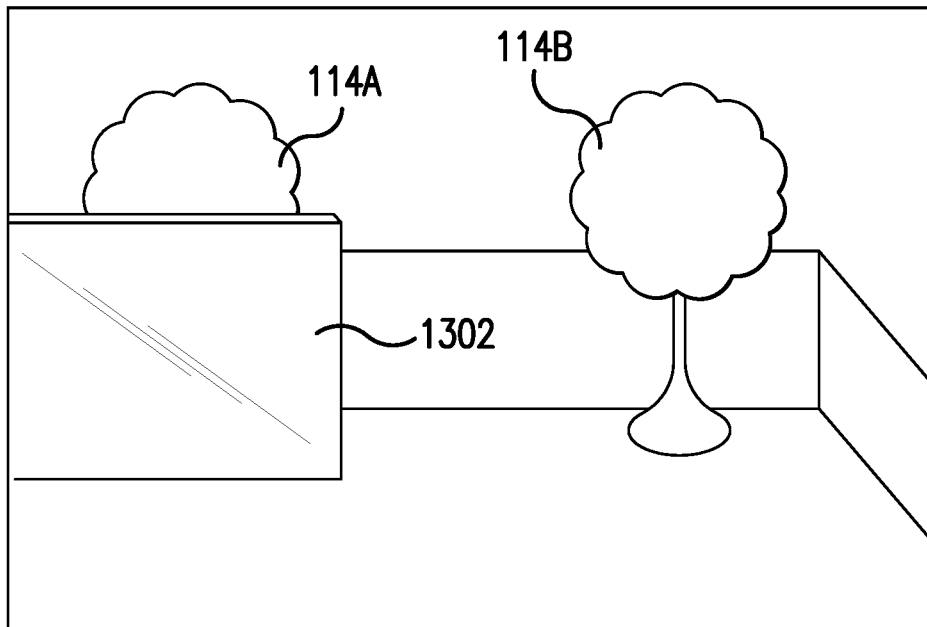
FIG. 14 illustrates an example background image.

Turning back FIG. 12, when the virtual camera is determined to have moved, steps 1204 and 1216 occur. At 1204, the conference application renders an image illustrating fixed objects of the environment from the perspective of the virtual camera. FIG. 14 illustrates an example of such an image 1400. Image 1400 captures the fixed objects the environment 1300 from the perspective of virtual camera 204. In particular, image 1400 illustrates arena 118, foliage 114A and 114B, and wall 1302. However, image 1400 lacks avatars 102A and 102B. Even if those avatars were in the field of view of virtual camera 204, they would still not be included in image 1400, because they represent dynamic objects.

Because image 1400 is only captured when virtual camera 204 first moves to a new location, image 1400 may be rendered at a higher resolution than would normally be rendered had image 1400 need to be rendered every frame.

Additionally or alternatively, image 1400 may be rendered to have a somewhat wider field of view than virtual camera 204 so that a user can rotate virtual camera 204 at least to some degree without having to re-render image 1400. In that embodiment, image 1400 may be cropped to reflect the new orientation of virtual camera 204.

At 1206, the conference application determines a depth map for the rendered image, in this example image 1400 in FIG. 14. The depth map specifies a distance from virtual camera to 204 each respective position on image 1400. In an embodiment, each pixel on image 1400 may have a corresponding value on the depth map to identify the distance from the fixed object depicted in that pixel to the virtual camera 208 in the virtual environment. As mentioned above, image 1400 may have a wider field of view than that of virtual camera 204. In that embodiment, the depth map may have a wider field of view as well.

Rendering the static image in the occlusion map in this way enables more efficient handling of rendering. Users tend to stay stationary, so there may be no need to render fixed objects for every frame. Instead, method 1200 allows for the fixed objects to be rendered from the perspective of the user only once when the user enters that position, thereby conserving resources.

As mentioned above, mipmapping may be used when rendering fixed (or, for that matter, dynamic) objects. As mentioned above, mipmapping is a technique where a high-resolution texture is downscaled and filtered so that each subsequent mip level is a quarter of the area of the previous level. While mipmapping may be applied when four mini textures, it may not be used when a model is defined by an alpha channel.

Turning back to FIG. 9, after the fixed objects are rendered at 904, the dynamic objects are rendered at 906. Not only are the dynamic objects rendered, but also foreground objects that allow light to pass through, like screens and glass, are rendered at step 906.

Figure 15:
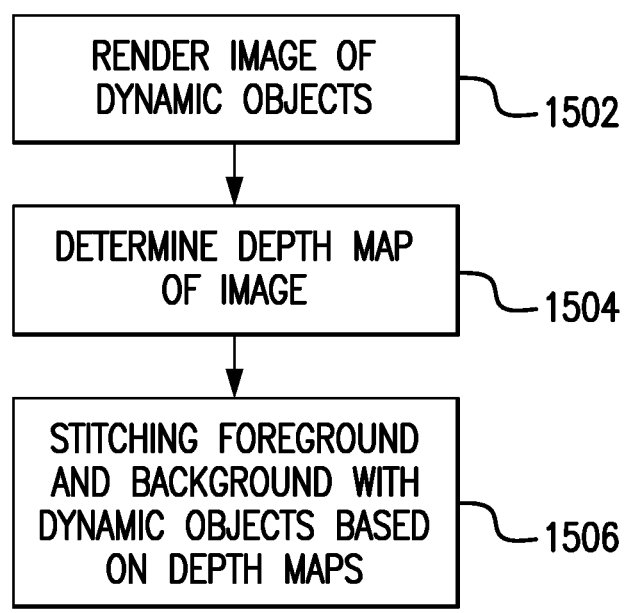
FIG. 15 is a flowchart illustrating a method for rendering dynamic objects and stitching together the dynamic objects with the background image using the inclusion.

FIG. 15 is a flowchart illustrating a method 1500 for rendering dynamic objects and stitching together the dynamic objects with the background image using inclusion. Method 1500 may occur in every key frame or every time the rendering loop is executed, regardless of whether the virtual camera has moved or has been stationary.

At 1502, the conference application renders an image of dynamic objects in the environment from the perspective of the virtual camera. As mentioned above, in addition to dynamic objects, transparent or translucent objects in the foreground between the virtual camera and the dynamic object may also be rendered, even though they are fixed. These transparent/translucent objects include, for example, glass.

Figure 16:
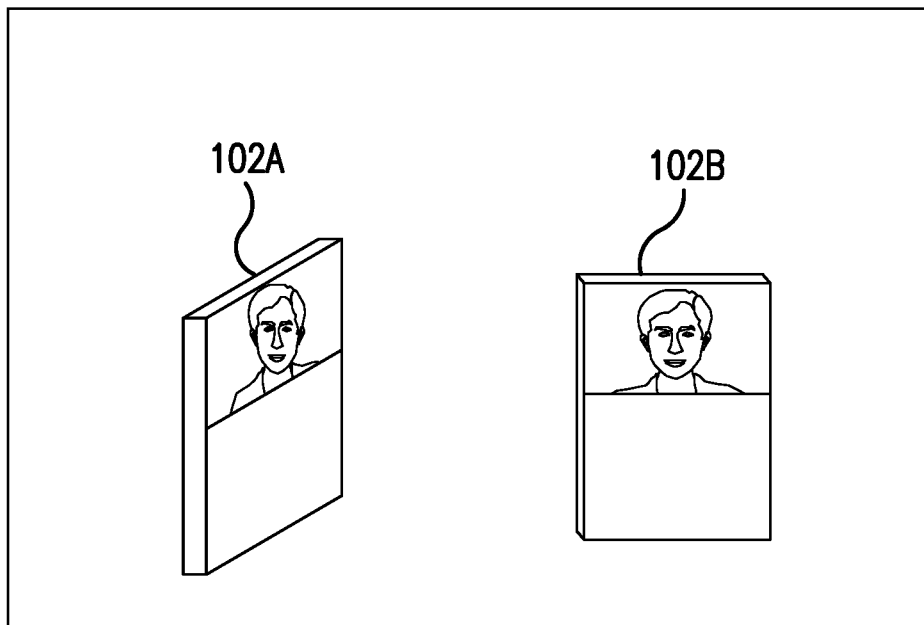
FIG. 16 illustrates an example image of dynamic objects.

FIG. 16 illustrates an example image 1600 of two dynamic objects. Continuing from the example in FIG. 13, two dynamic objects are within the field of view of virtual camera 204—avatars 102A-B. Thus, image 1600 illustrates avatars 102A and 102B from the perspective of virtual camera 204.

Returning to FIG. 15, at step 1504, the conference application determines a depth map of the image of the dynamic objects. Looking at the example provided in FIG. 16, the depth map determined at step 1504 may specify a distance from virtual camera 204 for each respective pixel of image 1600.

At step 1506, the conference application stitches the foreground and the background with dynamic objects based on the respective depth maps. In particular, the image determined at step 1502, which is executed each time the render loop is iterated, is stitched together with the image generated at step 1204, which is executed only when the virtual camera has changed position. When stitched together, these two images are used to generate a combined image illustrating both the fixed objects and dynamic objects.

In an embodiment, the stitching at step 1506 involves comparing the depth map determined at step 1206 and the distance map at step 1504. The comparison identifies a portion of the image determined in 1204 representing a foreground of the combined image where a fixed object occludes a dynamic object. The comparison also identifies a portion of the image determined in 1204 representing a background of the combined image where the dynamic object occludes the fixed object.

Figure 17:
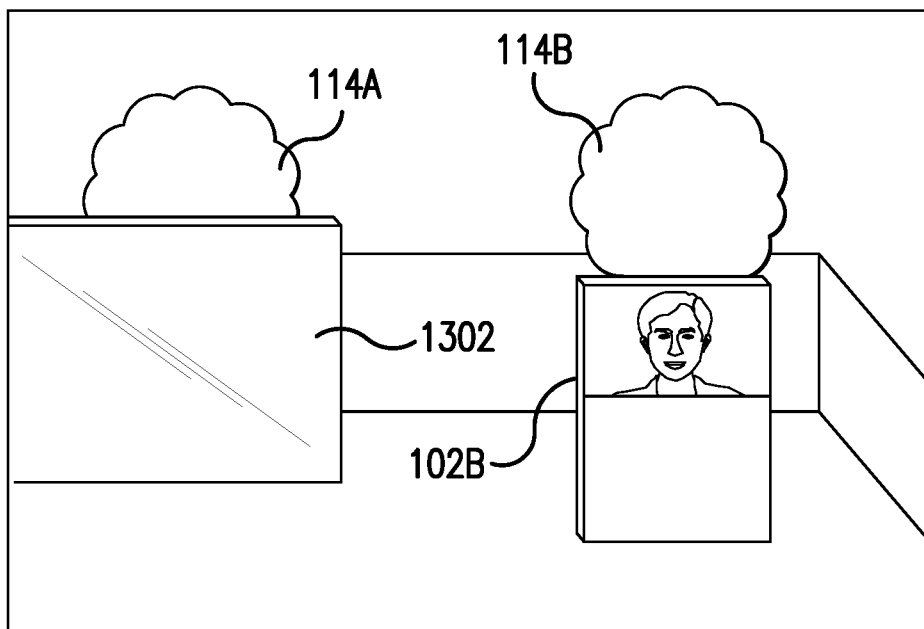
FIG. 17 illustrates an example image stitching together the dynamic objects with the background image using the occlusion map.

FIG. 17 illustrates an example image 1700 stitching together the dynamic objects with the background image using the occlusion map. As can be seen in image 1700, wall 1302 occludes avatar 102A. Thus, in the combined image 1700, avatar 102A is not visible. However, avatar 102B is not included; thus it is visible in combined image 1700. In addition, in the background behind avatar 102B, the combined image 1700 has foliage 114A and B and arena 118.

As a further optimization of the rendering in steps 904 and 906 of FIG. 9 and incorporating the example in FIG. 11A, avatar 1102 and ball 1110 are not labeled as fixed. Thus, scene 1120 must be evaluated. However, each of the avatar 1102 and ball 1110 are labeled as fixed. In this way, if avatar 1102 does not move, conference application 310 may recognize avatar 1102's child nodes—back 1122 and video 1124—will not move, so there is no need to update transformation matrices during rendering for those objects. In this way, the number of updates needed is reduced, and processing is more efficient.

Returning back to the rendering loop in FIG. 9, at 908, conference application 310 renders shadows and superimposes them on the combined image generated at step 906. The shadow rendering is discussed below with respect to FIGS. 18-23.

At 910, conference application 310 renders other UI elements. For example, turning to FIG. 1, there are various UI widgets that are rendered in top of the image. These include joystick interface 106 and buttons 108, 110, and 112. These UI interface elements are rendered at step 910 and overlaid on top of the rendered and shadowed image generated at 908.

At 912, conference application 310 conducts post-processing. Image post-processing may include various operations to make the rendered image feel more realistic. In one example, a Bloom effect may be applied. The Bloom effect produces fringes (or feathers) of light extending from the borders of bright areas in an image, contributing to the illusion of an extremely bright light overwhelming the camera or eye capturing the scene. Another example of a post-processing effect is depth of field blur.

Another example of post-processing may be tone mapping. Tone mapping is a technique used in image processing and computer graphics to map one set of colors to another to approximate the appearance of high-dynamic-range images in a medium that has a more limited dynamic range. Display devices such as LCD monitors may have a limited dynamic range that is inadequate to reproduce the full range of light intensities present in natural scenes. Tone mapping adjusts the level of contrast from a scene's radiance to the displayable range while preserving the image details and color appearance.

In a third example, image post-processing may include motion blur. Motion blur is the apparent streaking of moving objects in a photograph or a sequence of frames, such as a film or animation. It results when the image being recorded changes during the recording of a single exposure due to rapid movement of the camera or long exposure of the lens.

In various embodiments, any of the post-processing operations of step 912 may be applied only to the static background determined, as described above with respect to step 904. This embodiment may save processing power and increase performance.

In this way, conference application 310 produces an output image (e.g. frame) for display to a user. The render loop 530 may repeat so long as the application is running to enable the user to view and experience the three dimensional environment during the conference.

Efficient Shadow Rendering

As described above, the render loop generates shadows at step 908. Shadow rendering can be very computationally intensive. Methods are provided according to the embodiments to produce computationally efficient, yet realistic, shadows.

Figure 18:
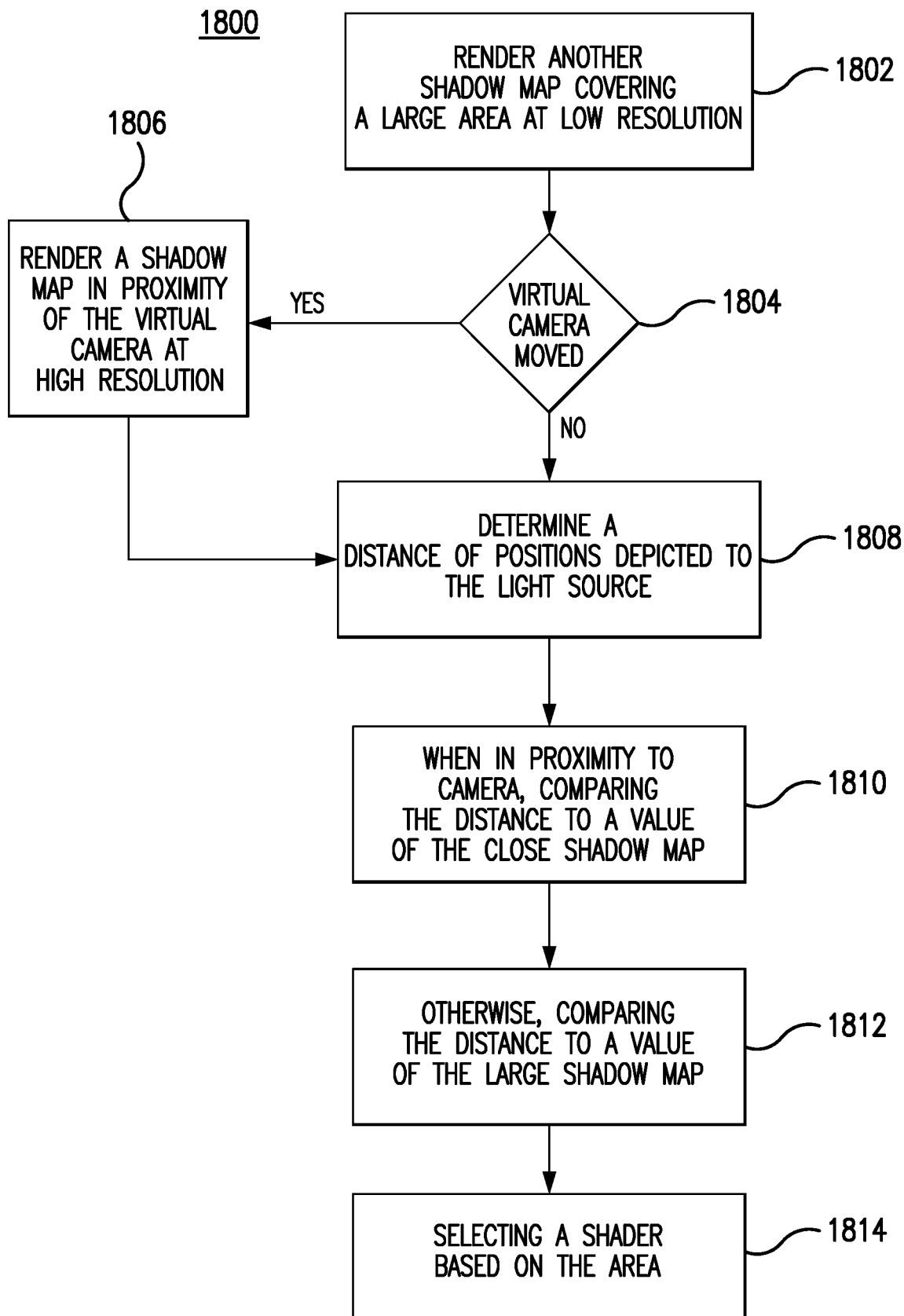
FIG. 18 is a flowchart illustrating a method for rendering shadow maps at different resolutions.

FIG. 18 is a flowchart illustrating a method 1800 for rendering shadow maps at different resolutions. In this way, method 1800 efficiently renders shadows in a three-dimensional virtual environment.

Method 1800 starts at step 1802. At 1802, the conference application 310 renders a shadow map covering a large area at a low resolution. The shadow map is rendered from a perspective of a light source in the three-dimensional virtual environment. In examples, the light source can be the sun or lamps placed within the three-dimensional virtual environment. If there are multiple lights, a separate depth map must be used for each light. The shadow map specifies a distance from the light source to objects of the three-dimensional virtual environment within an area in proximity of a virtual camera. Each pixel in the shadow map represents a distance from whatever object is visible to the light source. At 1802, the entire environment is rendered from the perspective of the light source.

Figure 19A:
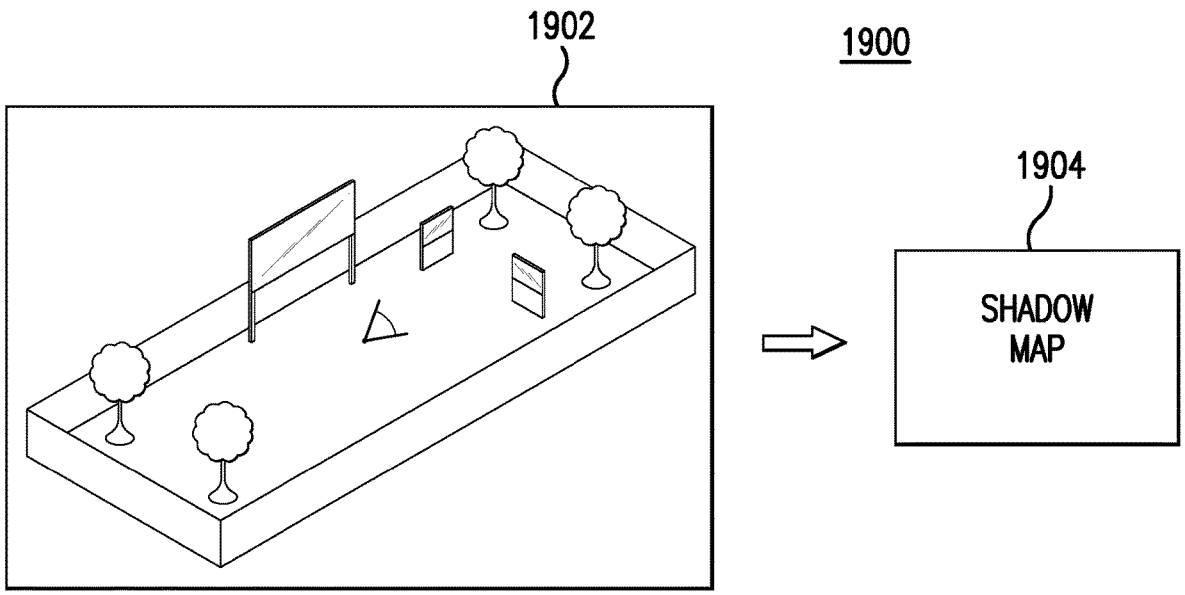
FIGS. 19A-B are diagrams illustrating examples of rendering shadow maps different resolutions.

FIG. 19A illustrates creation of one such large depth map in diagram 1900. The entire environment is captured at 1902, and the generated shadow map 1904 specifies a distance from the light source to every three-dimensional object visible to that light source. In this example, the light source may be the sun, which provides directional light. Thus, an orthographic projection may be used to generate shadow map 1904.

This depth map may be updated anytime there are changes to the light or the objects in the scene, but the depth map in 1902 may not need to be updated when the virtual camera moves.

To render the shadow map, conference application 310 samples locations in the three-dimensional virtual environment by extending rays from the perspective of the light source. According to an embodiment, this sampling can occur at an offset angle to provide for softer shadows.

Offset angle 2010 may be selected to prevent shadow acne. Shadow acne usually is caused by an acute angle between the sun and the object. Acute angles can occur on floors, for example, in sunrises and sunsets in the three-dimensional environment.

Turning back to FIG. 18, in this way, a shadow map covering a large area (perhaps the entire area) of the three-dimensional virtual environment is rendered at 1802. In addition to the low resolution, large area shadow map, a second shadow map of an area in proximity of the virtual camera may also be determined. This second shadow map may be of a narrow area within the three-dimensional environment, but it will be at a greater resolution than the shadow map determined at 1802.

At 1804, conference application 310 determines whether the virtual camera has moved since the last time the higher resolution shadow map was determined. In one embodiment, this process may involve determining whether any movement (translation, but perhaps not rotation) of the virtual camera has occurred since the last time a high-resolution zoomed-in shadow map was determined. In another embodiment, the determination may involve ascertaining whether the virtual camera is in within a particular distance of its prior location, i.e. where the virtual camera was located when the high-resolution shadow map was determined. If the virtual camera is determined to have moved, the operation proceeds to step 1806. Otherwise, the operation proceeds to step 1808.

At step 1806, the conference application 310 renders a shadow map covering a small area in proximity of the virtual camera. In an embodiment, the shadow map rendered at 1806 may be at a higher resolution than the shadow map rendered at step 1802. The offset sampling technique described with respect to FIG. 20 and step 1802 may be used to generate the shadow map at 1806.

Figure 19B:
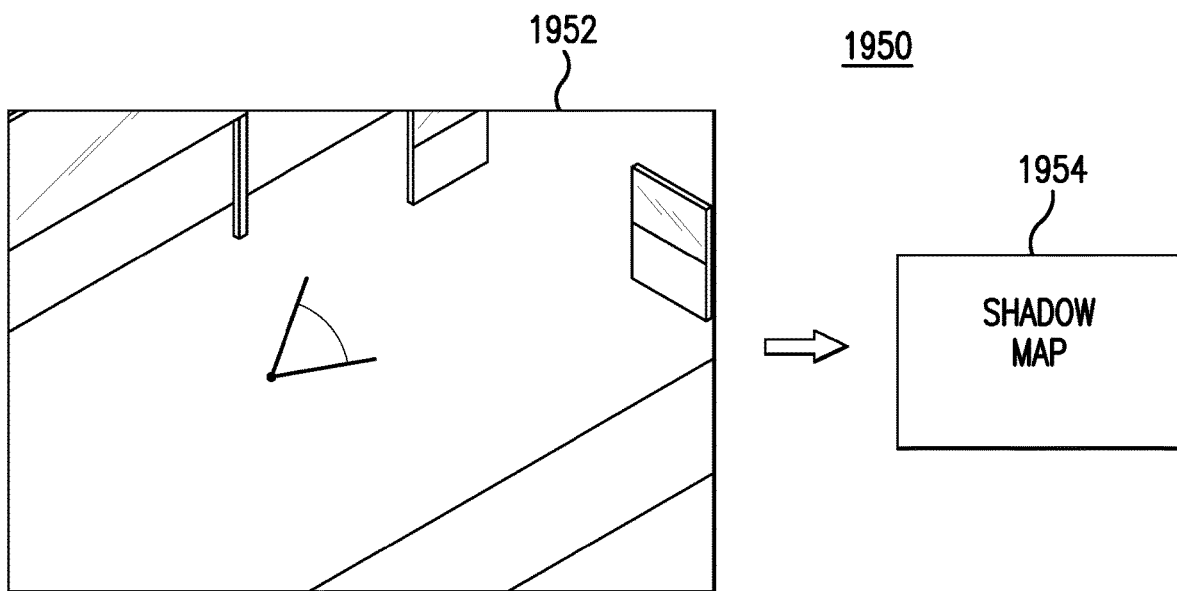

FIG. 19B is a diagram 1950 illustrating a smaller, zoomed in area 1952 used to generate a shadow map 1954. As with diagram 1900 and FIG. 19A, each pixel in the shadow map represents a distance from an object in the three-dimensional environment to the light source. In one embodiment, at 1802, an image of the entire environment is rendered from the perspective of the light source.

FIG. 19A illustrates creation of one such large depth map in diagram 1900. The entire environment is captured at 1902 and a shadow map 1904 is generated, specifying a distance from the light source to every three-dimensional object visible to that light source. In this example, the light source may be the sun, which provides directional light. Thus, an orthographic projection may be used to generate shadow map 1954. As described above, shadow map 1954 may be updated when the virtual camera moves a sufficient distance. In addition, shadow map 1954 may be updated any time there are changes to either the light or the objects in the scene.

At 1808, the conference application 310 determines positions of objects depicted in a rendered image to the light source. In the method in FIG. 9, for example, for each pixel of the rendered image produced in steps 904 and 906, a distance from the object in that scene to the light source is determined. In particular, to test a point in the rendered image, the point's position in the scene coordinates may be transformed into the equivalent position as seen by the light. This may be accomplished by a matrix multiplication. The location of the object on the screen is determined by the usual coordinate transformation, but a second set of coordinates may be generated to locate the object in light space. Using the light space coordinates, a Euclidean distance may be determined from the object to the light source.

In a further embodiment, the location of the pixel sampled may be offset from the pixel to be shaded. This is illustrated in FIG. 20A.

Figure 20A:
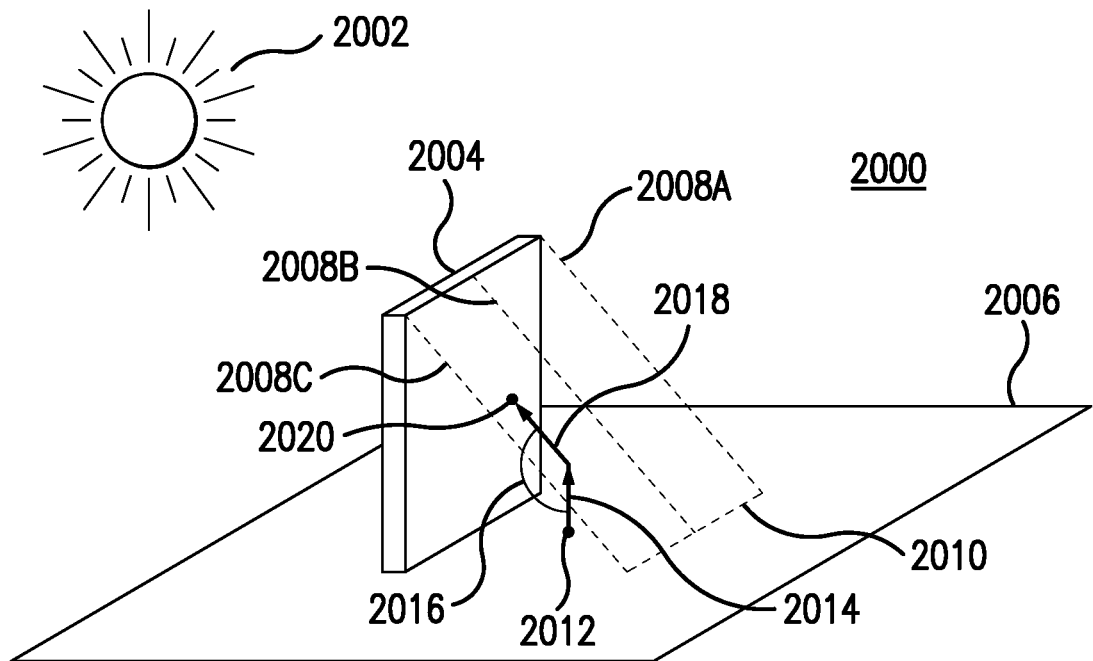
FIGS. 20A-C illustrate an example of sampling shadow maps at an offset.

FIG. 20A illustrates a diagram illustrating sampling a shadow map at an offset from the pixel to be sampled in the virtual camera.

In particular, FIG. 20A shows a diagram 200 illustrating a three-dimensional virtual environment from a perspective of a virtual camera. As depicted in diagram 2000, the three-dimensional virtual environment includes a ground 2006 and an obstruction 2004. Casting light onto ground 2006 and obstruction 2004 is a light source 2002.

Given the arrangement in FIG. 20, obstruction 2004 should cast a shadow in the rendered, rasterized image as illustrated by rays 2008A, B, and C. That shadow should intersect with ground 2006. The point on ground 2006 at which the shadow should end and illumination should begin is illustrated at line 2010. Because the shadow maps do not have perfect resolution, the resulting shadow along line 2010 can have artifacts. These artifacts are sometimes called shadow acne. To reduce shadow acne, an offset is applied between the pixel shaded area and the position tested in the shadow map.

More specifically, as described above, an image of the three-dimensional virtual environment is rendered from the perspective of the virtual camera. As mentioned above, to determine how to shade each pixel, a distance from a point in the three-dimensional environment depicted at each pixel to light source 2002 is determined. That point will be tested against a distance in a shadow map as described below with respect to steps 1810 and 1812.

According to the embodiment in FIG. 20A, to determine whether to shadow each respective pixel in the image, a position depicted at the pixel and a point for which the distance is determined in 1808 and that is tested against the shadow map at steps 1810 and 1812 are offset from one another. In the example in FIG. 20A, a position 2012 represents a position in the three-dimensional virtual environment at a pixel that a conference application is determining whether to shadow. Point 2020 is a point in the three-dimensional environment that is offset from position 2012.

In an embodiment, point 2020 and position 2012 are offset from one another by two vectors: vector 2014 and vector 2018. Vector 2014 applies a first offset value in the normal direction from ground 2006. Vector 2018 applies a second offset value in a direction towards light source 2002. These values can be tuned to reduce the appearance of shadow acne.

When determining whether or not to shade the pixel rendering position 2012, the conference application can instead rely on point 2020. In particular, turning to FIG. 18, a distance between light source 2002 and point 2020 is determined at step 1808. As will be described in greater detail below at steps 1810 and 1812, point 2020 is looked up in a shadow map and the distance reported from the shadow map for point 2020 is compared against the distance determined at step 1808. When the distance from the shadow map is less than the distance determined at step 1808, the pixel at 2012 is rendered as shadowed from light source 2002. When the distance from the shadow map is greater than the distance determined at step 1808, the pixel at 2012 is rendered as illuminated by light source 2002.

At 1810, the conference application determines the distance to the value of the position in the shadow map rendered in 1806. For each pixel in the rendered image, conference application 310 determines whether the location is in proximity of the virtual camera. This can be done using the scene coordinates of the rendered image. When the location is in proximity to the rendered image, the distance value determined in 1808 is compared to the high-resolution shadow map determined in 1806. When the location is available on the high-resolution shadow map in 1806, then that value is used in step 1810.

When the object in the image is not in proximity of the virtual camera and thus is not available in the high-resolution shadow map in 1806, at step 1812, the conference application compares the distance to the value of the position in the shadow map rendered in step 1802. As described above with respect to FIG. 20A, a shadow map can be sampled from an offset position.

A binary result in steps 1810 and 1812— shadowed or illuminated—can sometimes also result in unwanted artifacts around the edge of a shadow, such as a shadow cast by obstruction 2004. To soften the edge of a shadow, embodiments may sample a plurality of points, as illustrated in FIGS. 20B and C.

Figure 20B:
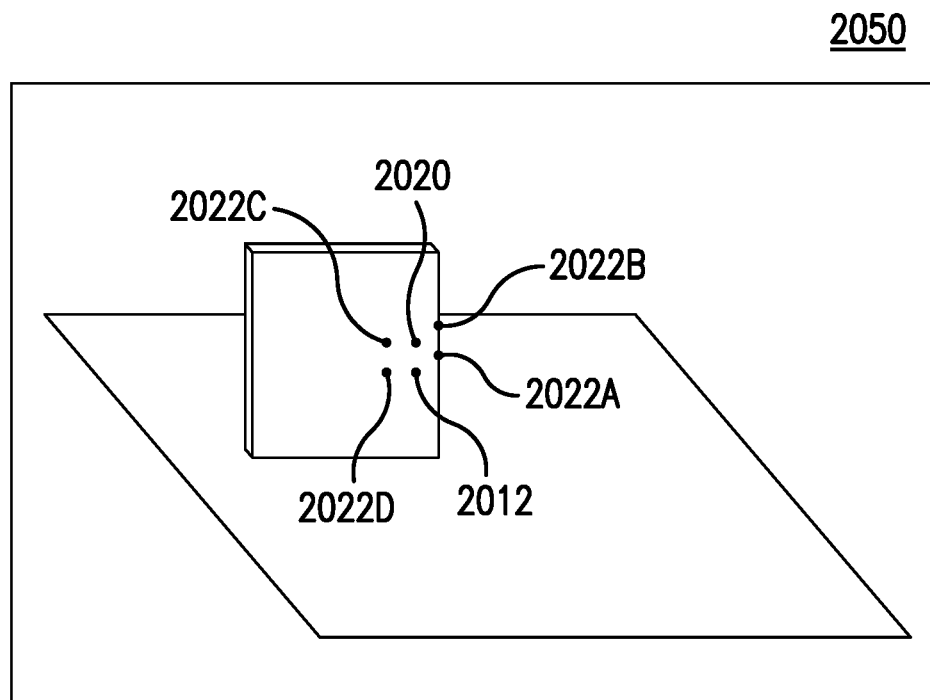
Figure 20C:
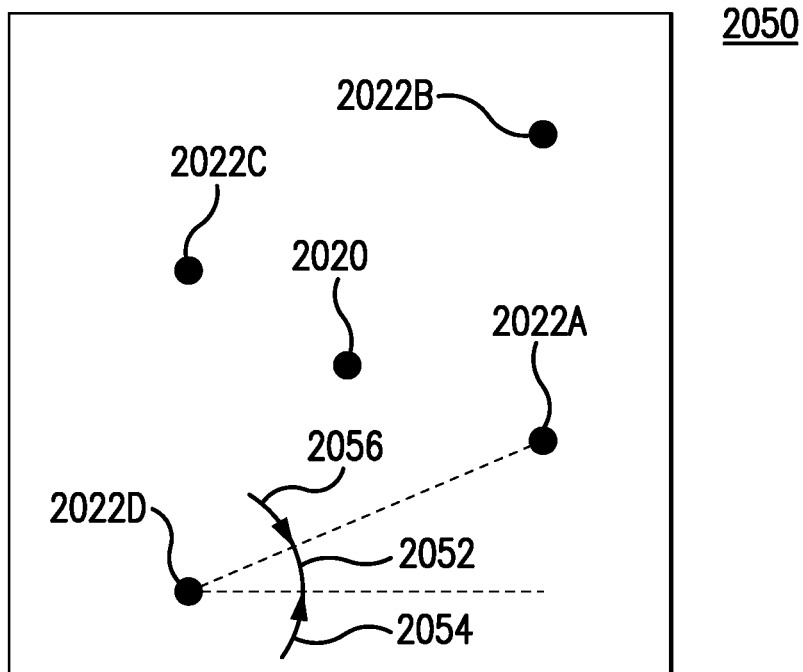

FIG. 20B illustrates scene 2050 from a perspective of light source 2002. Scene 2050 includes position 2012 and point 2020 determined by the offset as described above with respect to FIG. 20A. As illustrated in FIG. 20 B, the conference application selects, from the shadow map, a plurality of pixels in the shadow map surrounding point 2020 are determined as illustrated by pixels 2022A, B, C, and D. For each pixel, a distance stored at the pixel as a tree for shadow map is retrieved.

As described above, at step 1808, a distance from point 2020 to light source 2002 is determined. The distance between point 2020 and light source 2002 is compared to each of the retrieved distances for pixels 2022A, B, C, and D. The amount of distances retrieved from the shadow map that exceeds the distance from point 2020 to light source 2002 is counted. This quantity may be used to determine the degree to which shading is applied, as described below with respect to step 1814. This may be done using a simple ratio or average.

In the example in FIG. 20B, the retrieved shadow map values for pixels 2022B, C, and D may be less than the distance determined for point 2020, because those pixels intersect with obstruction 2004 before reaching point 2020. On the other hand, the retrieved shadow map values for pixel 2022A may be greater than the distance determined for point 2020, because that pixel does not intersect with obstruction 2004 and continues to intersect with ground 2006. Thus, the ratio may be 75% shading to be applied to point 2012.

FIG. 20 C illustrates a zoomed-in view of scene 2050. As illustrated in FIG. 20 C, the sample pixels 2022A,B,C, and D may be in a rotated square pattern. According to an embodiment, the sampling occurs at an offset angle 2052 from line 2054 parallel to the ground. Offset angle 2052 represents an angle between line 2054 and a line 2056 that connects sampling points 2022D and 2022A.

At 1814, the comparison performed at steps 1810 and 1812 is used to shade the rendered image. A shader may be selected based on whether or not the pixel is in proximity of the virtual camera. When the position is not in proximity of the virtual camera, a simplified shader that requires less processing power may be used. The simplified shader may also be selected based on the property selected in FIG. 7. Additionally or alternatively, the setting described above with respect to FIG. 7 may cause shadow rendering to be disabled entirely. In examples, the shading algorithms can be percentage closer filtering shading and pixelated shading, where percentage closer filtering is the more computationally intensive. As described above with respect to FIGS. 20B and C, the shading can be done based on an aggregate of a plurality of samples from the shadow map.

Figure 21:
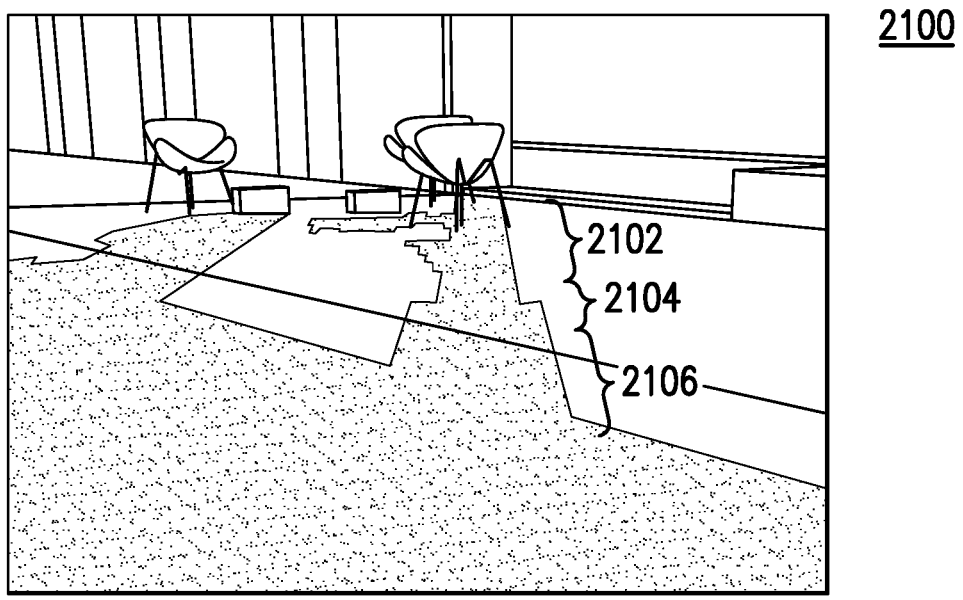
FIG. 21 illustrates an example of fading between shadows generated from shadow maps of different resolutions.

FIG. 21 illustrates a diagram 2100 illustrating an example of fading between shadows generated from shadow maps of different resolutions. Shadow 2102 is far from the virtual camera, those shadows are generated using wide area shadow maps at a lower resolution and using a shader that is simpler to execute. Shadow 2104 is close to the virtual camera, those shadows are generated using narrower area shadow maps at a higher resolution and using a shader that is more computationally intensive. Between the two regions is a transition area 2104 where the two shadows are blended (or faded) together to make a smooth transition.

Figure 22:
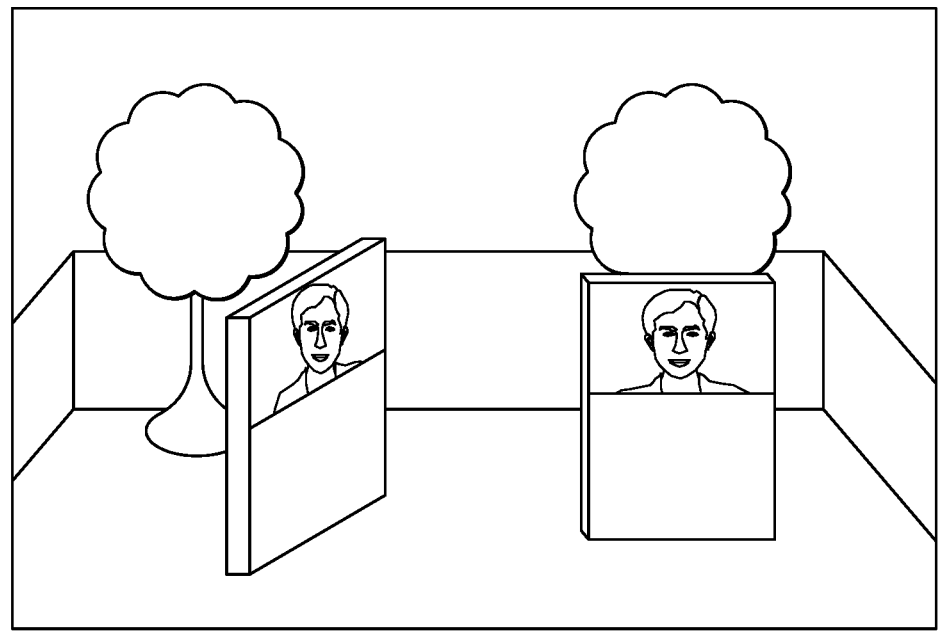
FIGS. 22 and 23 illustrate an example of how shadow maps are used to shade a scene.
Figure 23:
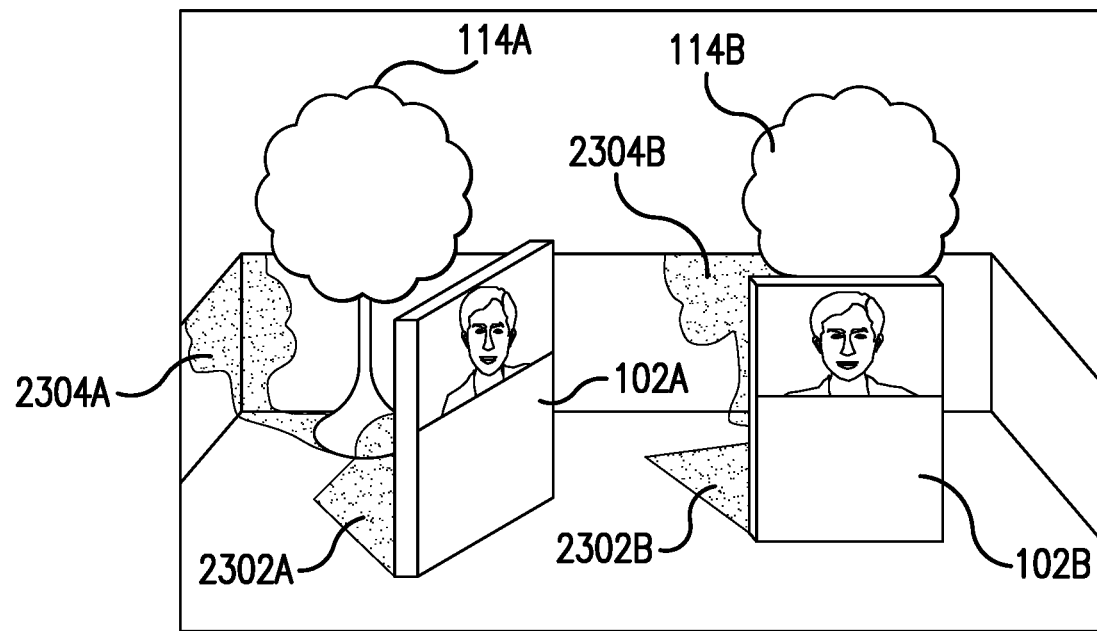

FIGS. 22 and 23 illustrate how shadow maps are used to shade a scene. FIG. 22 illustrates a diagram 2200 illustrating a rendered image and FIG. 23 illustrates a diagram 2300 showing the shadow applied to the rendered image.

Volumetric Light Scattering

According to embodiments, during the rendering process, the conference application generates a foreground light scattering effect which creates the appearance of fog for participants. This improves the appearance of the scene as rays of light become visible and provide increased perception of depth and scale. In different embodiments, the conference application may apply this light scattering effect during the post-processing of step 912 of FIG. 9 or in the rendering steps 904 or 906 of FIG. 9.

Figure 24A:
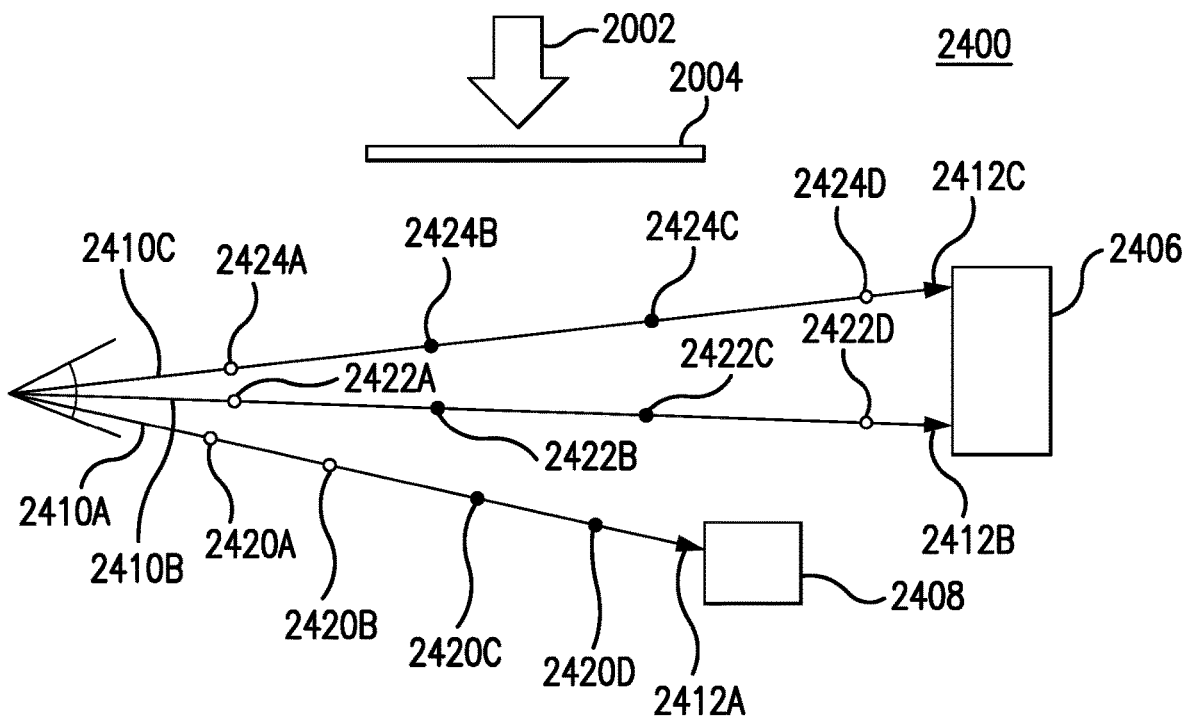
FIGS. 24A-C illustrate generating a volumetric scattering effect.

FIG. 24A illustrates a diagram 2400 showing a three dimensional virtual environment with light source 2002 and obstruction 2004. In addition, diagram 2400 includes objects 2405 and 2408 and a virtual camera 2001.

As described above with respect to FIGS. 19A-B, 20A-C and 21, a shadow map is rendered of at least a portion of the three-dimensional virtual environment from a perspective of light source 2002 in the three-dimensional virtual environment. The shadow map specifies a plurality of distances from the light source to objects of the three-dimensional virtual environment, including obstruction 2004 and objects 2405 and 2408.

The conference application renders an image of the three-dimensional virtual environment from the perspective of virtual camera 2001. The conference application renders an image of the three-dimensional virtual environment from the perspective of virtual camera 2001. As part of this rendering process rasterization takes place. During this rasterization process for every pixel on the screen a position and color is calculated. Pixels on the screen are first calculated by rasterization, giving them a color and a position. Then, a ray is calculated from the pixel to the virtual camera. The conference application extends a plurality of rays from virtual camera 2001. In FIG. 24A, those rays are illustrated, for example, as rays 2412A, B, and C. Those extended rays are intersected with objects in the three-dimensional virtual environment.

According to an embodiment, a scattering effect is supplied to the rendered image. To apply the scattering effect, for respective pixels of the image, a plurality of points are identified in the three-dimensional virtual environment along a ray that is extended from respective pixel of an object to the virtual camera. The points may be sampled at regular intervals. As illustrated in diagram 2400, points 2420A, B, C, and D are identified along ray 2410A; points 2422A, B, C, and D are sampled along ray 2410B; and points 2424A, B, C, and D are sampled along ray 2410C.

Once the plurality points are identified, they are assessed against the shadow map similar to the shadow processing described above. For each of the plurality of points (in diagram 2400, points 2420A-D, points 2422A-D and points 2440A-D), a distance is selected from the shadow map position at the respective point. And, for each of the plurality of points (in diagram 2400, points 2420A-D, points 2422A-D and points 2440A-D), a distance from the points to light source 2002 is determined. The distance from the shadow map is compared to the determined distance to the light source. Based on the comparison, the application is able to determine whether each respective point is exposed to the light source. In diagram 2400, points 2420A, 2420B, 2422A, 2424A, 2422D, and 2424D are exposed to light source 2002, and points 2420C, 2420D, 2422C, 2422D, 2424C, and 2424D are not.

For each ray, a number of the plurality of points are determined to be exposed to the light source. Based on that number, a scattering effect is applied at the respective pixel for the ray. In an embodiment, a ratio of the number of points exposed to the light source to a number of points sampled along the ray is determined, and that ration is used to apply the scattering effect. In this way, a fog effect may be determined. In additional or alternative, the scattering effect may be applied based at least in part on at least one of: (i) intensity of the light source, (ii) intensity of ambient light in the three-dimensional virtual environment, (iii) a value indicating a desired density of the fog, (iv) a value indicating a desired brightness of the fog (e.g., white or black smoke), or (v) a length of the ray. In further embodiments, for respective points 2420A-D, points 2422A-D and points 2440A-D, the conference application steps from the pixel on the screen towards the camera, and at every step the conference application uses the light coming from the direction of the pixel so far, the outgoing scattering, absorption, emission, and incoming (sun)light to determine the scattering effect.

As described above, the plurality of points are sampled along the ray at regular intervals between the virtual camera and an intersection of a ray with an object in a three-dimensional environment. In an embodiment, when a distance, between the virtual camera and an intersection of the ray with an object exceed a maximum distance, the plurality of points are only sampled up to the maximum distance.

Figure 24B:
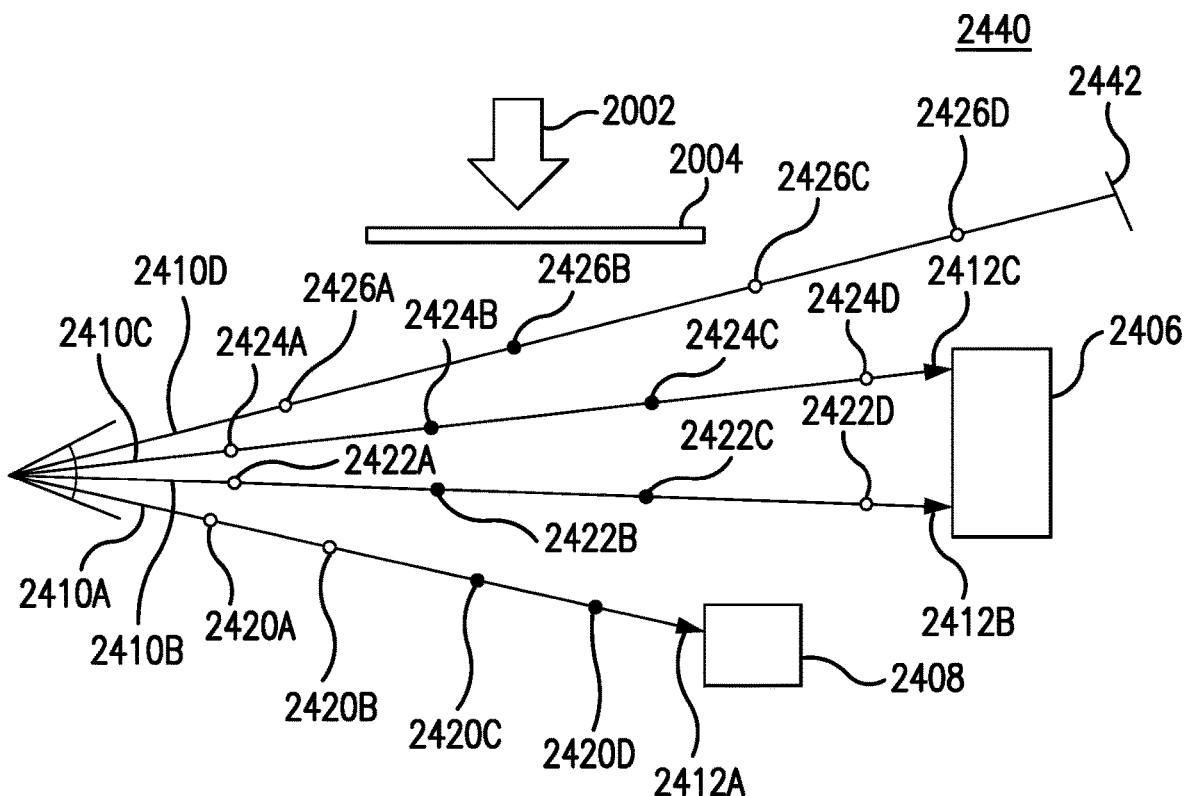

This is illustrated in FIG. 24B illustrating a diagram 2400. Diagram 2400 includes a ray 2410 and a plurality of points 2426A, 2426B, 2426C, and 2426D sampled up to a maximum distance 2442. Capping the sampled points to the maximum distance may allow for strong fog effects up close while not completely obscuring objects in the distance.

Figure 24C:
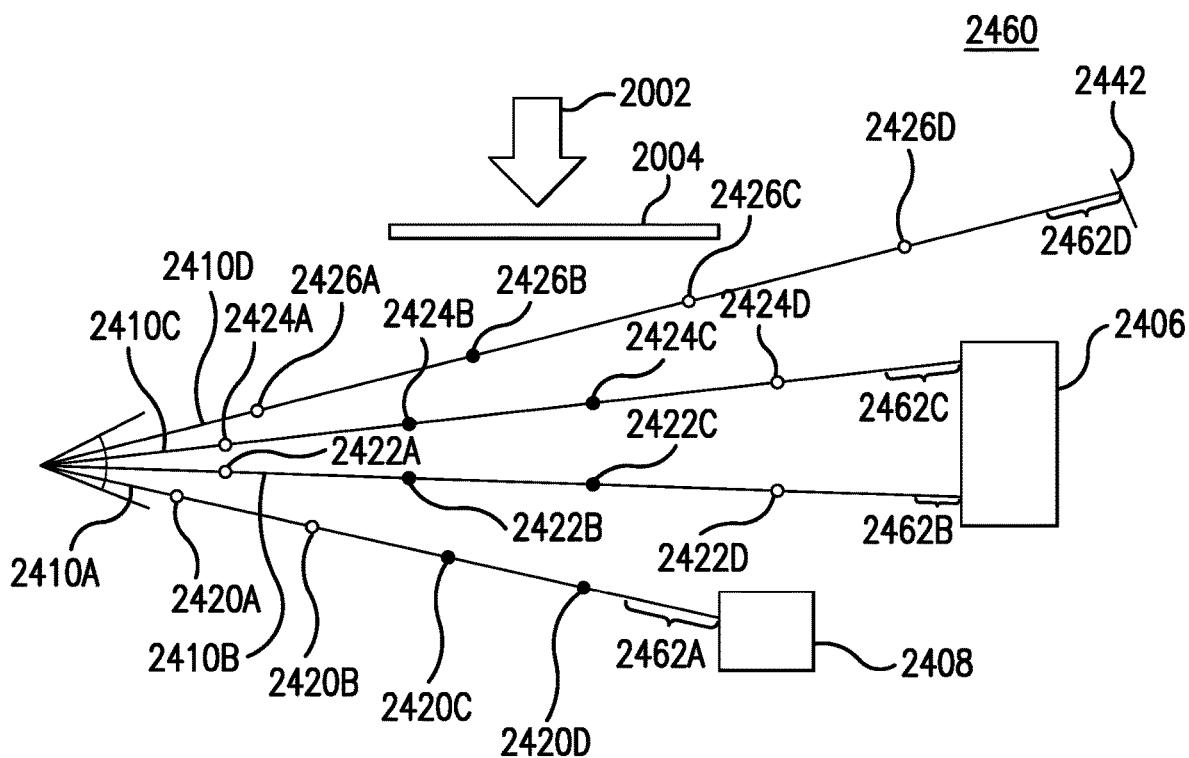

In a further embodiment, an offset value may be used to determined where to sample points along the ray. This is illustrated in FIG. 24C which illustrates a diagram 2460. Diagram 2460 illustrates an offset 2462A for ray 2410A, an offset 2462B for ray 2410B, an offset 2462C for ray 2410C, and an offset 2462D for ray 2410D. The conference application determines a portion of the ray offset from the object and samples the plurality of points along the portion of the ray at regular interviews.

In one embodiment, the offset value may be determined randomly as noise to make for a softer fog effect. The noise may be blue noise, that is noise without a low frequency component. This blue noise evens out the sampling errors and gives a pleasing result. To prevent the structure of this blue noise texture from being noticeable when the camera rotates or is moved, one of a number of different noise textures may be selected every frame as long as the camera is moving. When the camera stops, the noise also stops changing in order to give a calmer view. Additionally or alternatively, a blur may be performed on the calculated fog to remove noise.

In another embodiment, the offset value varies over time to create an appearance of precipitation in the environment. To create this effect, a shadow map or depth map may be generated to point in the direction the precipitation is falling. This can be straight down, or slightly angled as caused by the wind. The general volumetric shadow algorithm discussed above is used to determine how much rain should be visible for a specific pixel on the screen. Finally, instead of using noise for the offset, animated streaks that move across the screen in the direction the precipitation is falling are used. In different example implementations, this can create an appearance of rain, snow, hail, falling ash, or blowing dust. Additional, this depth map can be used to dynamically determine which parts of the scene should be wet (and reflective) and which ones should be rendered dry.

In different embodiments, the scattering effect may be determined at a lower resolution to increase performance or at a higher resolution to improve quality.

System Architecture

Figure 25:
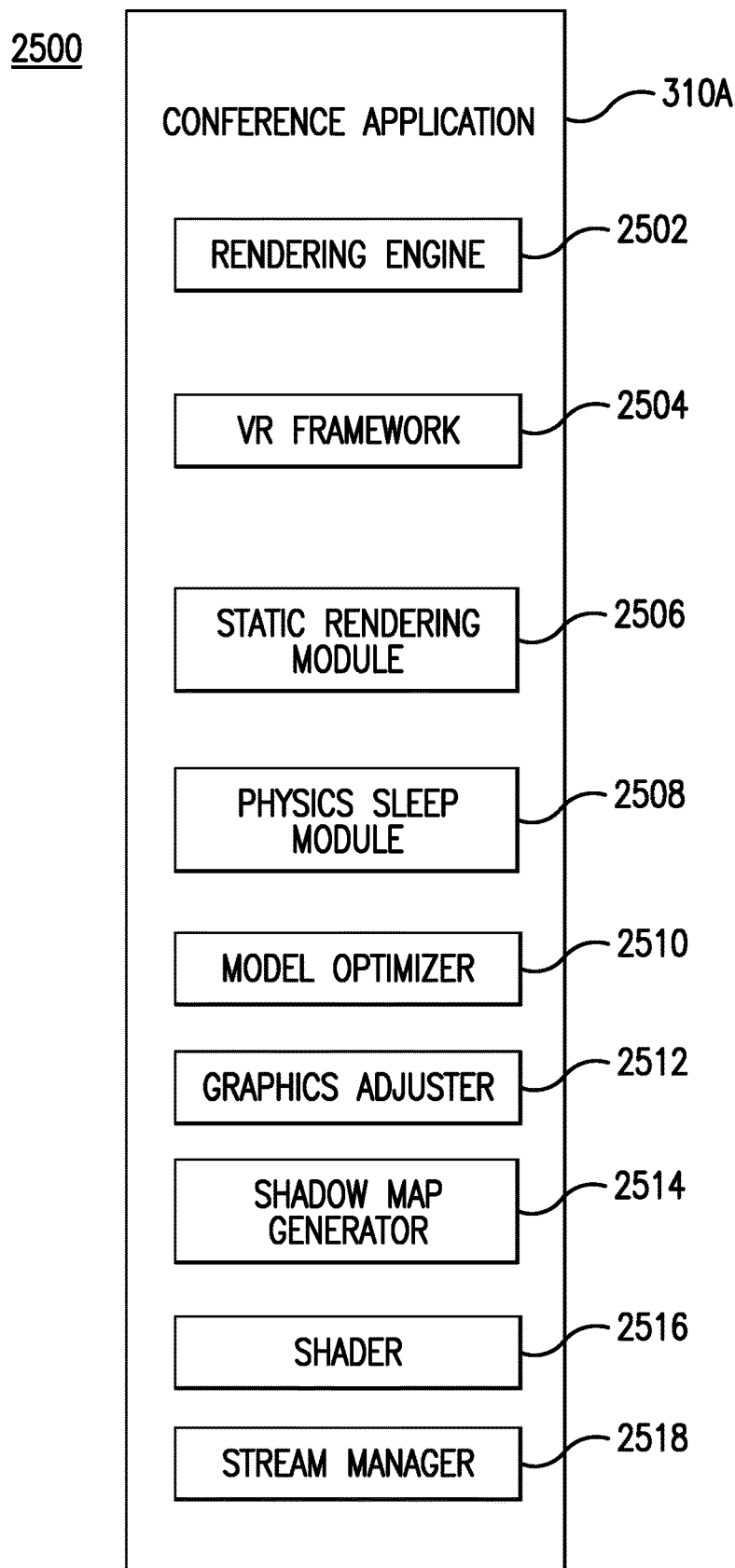
FIG. 25 illustrates components of the conference application running on a client device.

FIG. 25 is a diagram 2500 illustrating components of conference application 310A in greater detail. Conference application 310A includes a rendering engine 2502, a VR framework 2504, a static rendering module 2506, a physics sleep module 2508, a model optimizer 2510, a graphics adjuster 2512, shadow map generator 2514, a shader 2516, and a stream manager 2518.

Rendering engine 2502 includes a rendering a rendering library such as a three.js rendering library. Three.js is a cross-browser JavaScript library and application programming interface (API) used to create and display animated 3D computer graphics in a web browser using WebGL. Three.js allows the creation of graphical processing unit (GPU)-accelerated 3D animations using the JavaScript language as part of a website without relying on proprietary browser plugins.

Rendering engine 2502 may have a variety of rendering capabilities including, but not limited to:
Effects: Anaglyph, cross-eyed, and parallax barrier.
Scenes: add and remove objects at run-time; fog.
Cameras: perspective and orthographic; controllers: trackball, FPS, path, and more.
Animation: armatures, forward kinematics, inverse kinematics, morph, and keyframe.
Lights: ambient, direction, point, and spot lights; casting and receiving shadows.
Materials: Lambert, Phong, smooth shading, textures, and more.
Shaders: access to full OpenGL Shading Language (GLSL) capabilities: lens flare, depth pass, and extensive post-processing library.
Objects: meshes, particles, sprites, lines, ribbons, bones, and more, all with Level of detail.
Geometry: plane, cube, sphere, torus, 3D text, and more; lathe, extrude, and tube modifiers.
Data loaders: binary, image, JSON, and scene.
Utilities: full set of time and 3D math functions including frustum, matrix, quaternion, UVs, and more.
Export and import: utilities to create Three.js-compatible JSON files from within Blender, openCTM, FBX, Max, and OBJ.
Support: API documentation is under construction. A public forum and wiki is in full operation.
Virtual and Augmented Reality via WebXR.

As described above throughout, using these capabilities, rendering engine 2502 renders, from a perspective of a virtual camera of the user of device 306A, for output to display 2610, the three-dimensional virtual space including the texture-mapped three-dimensional models of the avatars for respective participants located at the received, corresponding position and oriented at the direction. Renderer 2618 also renders any other three-dimensional models including for example the presentation screen.

VR framework 2504 is a framework that provides VR capabilities. In an example, VR framework 2504 includes an A-Frame VR framework. A-Frame is an open-source web framework for building virtual reality (VR) experiences. A-Frame is an entity component system framework for a JavaScript rendering engine that allows developers to create 3D and WebVR scenes using HTML Static rendering module 2506 provides for static rendering of a background image and use of and occlusion map to determine what portions of the image are background in which portions are foreground. This is described above, for example, with respect to FIGS. 12-17.

Physics sleep module 2508 disables physics determination for static objects. This is described above, for example, with respect to FIGS. 10 and 11B.

Model optimizer 2510 provide certain optimizations as the A-frame model understood by VR framework 2504 is transformed into a scene graph understood by rendering engine 2502. These optimizations are described, for example, with respect to FIG. 5B and FIG. 8.

Graphics adjuster 2512 adjusts graphics processing based on the property setting discussed above throughout and provided as an example in FIG. 7. For example, graphics adjuster 2512 may request different quality textures from server 302 depending on the setting selected.

Shadow map generator 2514 generates cascading shadow maps as described above with respect to FIGS. 18, 19A-B and 20. As described above, shadow maps describe a depth of different objects of in a virtual environment from the perspective of a light source. This shadow map is used by shader 2516 to shade the image.

Shader 2516 uses the shadow maps to shade the image as discussed above for example with respect to FIGS. 21-23.

Stream manager 2518 sends video streams and receives video streams from other users via an intermediate server 302. As described above, stream manager 2518 may include built-in web RTC capabilities.

Figure 26:
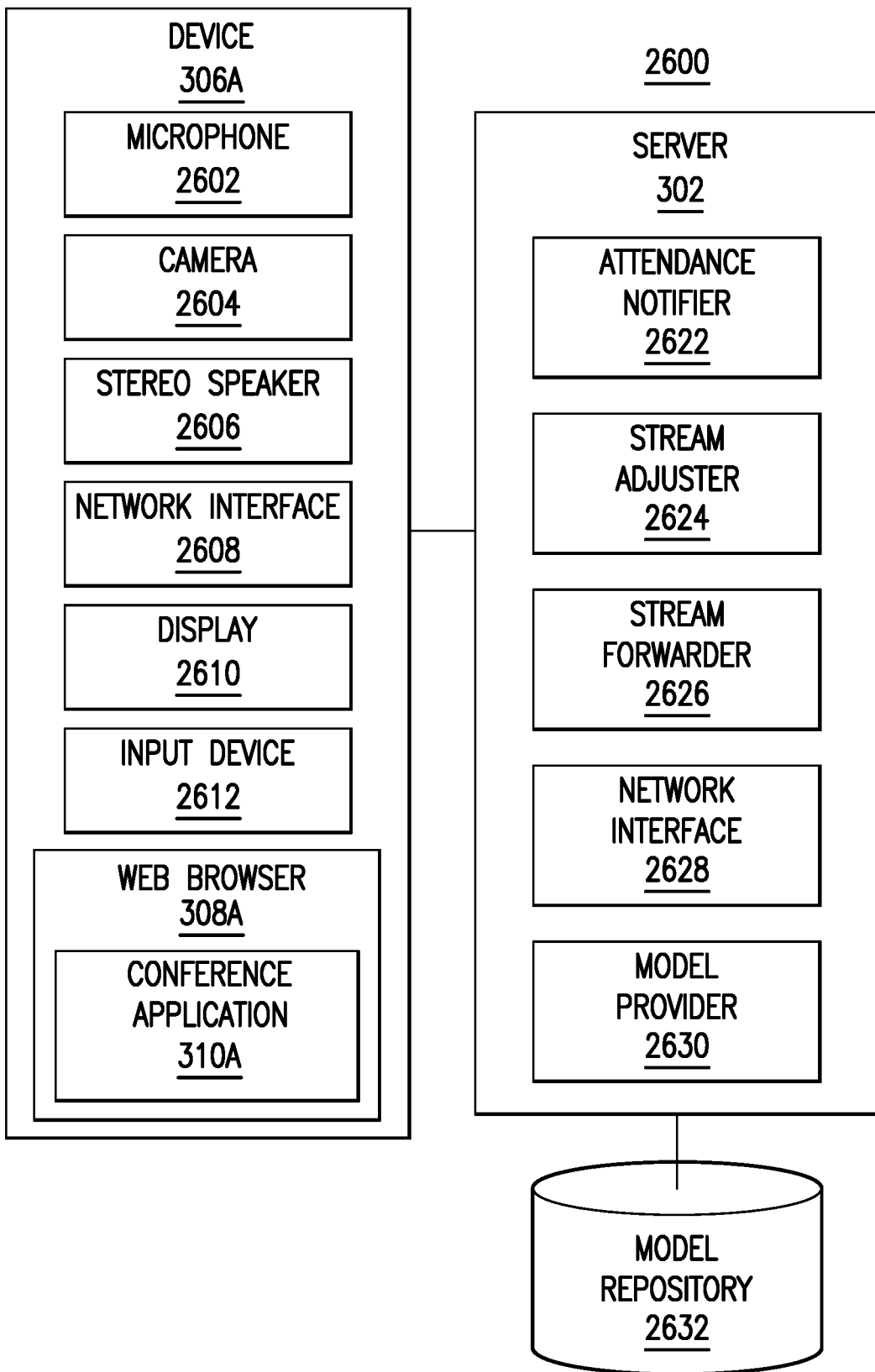
FIG. 26 illustrates a system diagram of the client and server device in a video conference application in a virtual environment.

FIG. 26 illustrates a system diagram of the client and server device in a video conference application in a virtual environment.

Device 306A is a user computing device. Device 306A could be a desktop or laptop computer, a smartphone, a tablet, or a wearable computing device (e.g., watch or head mounted device). Device 306A includes a microphone 2602, camera 2604, stereo speaker 2606, and input device 2612. Not shown, device 306A also includes a processor and persistent, non-transitory and volatile memory. The processors can include one or more central processing units, graphic processing units or any combination thereof.

Microphone 2602 converts sound into an electrical signal. Microphone 2602 is positioned to capture speech of a user of device 306A. In different examples, microphone 2602 could be a condenser microphone, electret microphone, moving-coil microphone, ribbon microphone, carbon microphone, piezo microphone, fiber-optic microphone, laser microphone, water microphone, or MEMS (microelectromechanical systems) microphone.

Camera 2604 captures image data by capturing light, generally through one or more lenses. Camera 2604 is positioned to capture photographic images of a user of device 306A. Camera 2604 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 2604 captures images and videos.

Stereo speaker 2606 is a device which converts an electrical audio signal into a corresponding left-right sound. Stereo speaker 2606 outputs the left audio stream and the right audio stream generated by an audio processor 2620 (below) to be played in stereo to device 306A's user. Stereo speaker 2606 includes both ambient speakers and headphones that are designed to play sound directly into a user's left and right ears. Example speakers include: moving-iron loudspeakers; piezoelectric speakers; magnetostatic loudspeakers; electrostatic loudspeakers; ribbon and planar magnetic loudspeakers; bending wave loudspeakers; flat panel loudspeakers; heil air motion transducers; transparent ionic conduction speakers; plasma arc speakers; thermoacoustic speakers; rotary woofers; and moving-coil, electrostatic, electret, planar magnetic, and balanced armatures.

Network interface 2608 is a software or hardware interface between two pieces of equipment or protocol layers in a computer network. Network interface 2608 receives a video stream from server 302 for respective participants for the meeting. The video stream is captured from a camera on a device of another participant to the video conference. Network interface 2608 also received data specifying a three-dimensional virtual space and any models therein from server 302. For each of the other participants, network interface 2608 receives a position and direction in the three-dimensional virtual space. The position and direction are input by each of the respective other participants.

Network interface 2608 also transmits data to server 302. It transmits the position of the user of device 306A's virtual camera used by renderer 2618 and it transmits video and audio streams from camera 2604 and microphone 2602.

Display 2610 is an output device for presentation of electronic information in visual or tactile form (the latter used for example in tactile electronic displays for blind people). Display 2610 could be a television set; a computer monitor; a head-mounted display; a heads-up display; an output of a augmented reality or virtual reality headset; a broadcast reference monitor; a medical monitor; a mobile display (for mobile devices); or a smartphone display (for smartphones). To present the information, display 2610 may include an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, or quantum dot (QLED) display.

Input device 2612 is a piece of equipment used to provide data and control signals to an information processing system such as a computer or information appliance. Input device 2612 allows a user to input a new desired position of a virtual camera used by renderer 2618, thereby enabling navigation in the three-dimensional environment. Examples of input devices include keyboards, mouse, scanners, joysticks, and touchscreens.

Web browser 308A and conference application 310A were described above.

Server 302 includes an attendance notifier 2622, a stream adjuster 2624, and a stream forwarder 2626.

Attendance notifier 2622 notifies conference participants when participants join and leave the meeting. When a new participant joins the meeting, attendance notifier 2622 sends a message to the devices of the other participants to the conference indicating that a new participant has joined. Attendance notifier 2622 signals stream forwarder 2626 to start forwarding video, audio, and position/direction information to the other participants.

Stream adjuster 2624 receives a video stream captured from a camera on a device of a first user. Stream adjuster 2624 determines an available bandwidth to transmit data for the virtual conference to the second user. It determines a distance between a first user and a second user in a virtual conference space, and it apportions the available bandwidth between the first video stream and the second video stream based on the relative distance. In this way, stream adjuster 2624 prioritizes video streams of closer users over video streams from farther ones. Additionally or alternatively, stream adjuster 2624 may be located on device 306A, perhaps as part of web application 310A.

Stream forwarder 2626 broadcasts position/direction information, video, audio, and screen share screens it receives (with adjustments made by stream adjuster 2624). Stream forwarder 2626 may send information to the device 306A in response to a request from conference application 310A. Conference application 310A may send that request in response to the notification from attendance notifier 2622.

Model provider 2630 provides different textures from model repository 2632 as described above with respect to FIG. 7.

Network interface 2628 is a software or hardware interface between two pieces of equipment or protocol layers in a computer network. Network interface 2628 transmits the model information to devices of the various participants. Network interface 2628 receives video, audio, and screen share screens from the various participants.

A screen capturer 2614, a texture mapper 2616, a renderer 2618, an audio processor 2620, an attendance notifier 2622, a stream adjuster 2624, and a stream forwarder 2626 can each be implemented in hardware, software, firmware, or any combination thereof.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for optimizing physics simulation in a three-dimensional ("3D") virtual environment including a plurality of objects displayed in a scene of a video conferencing application to a user, comprising:
   evaluating each object in the plurality of objects to determine that a particular object's position, rotation, or scale has changed, wherein each object in the plurality of objects is represented by a node in a tree hierarchy, wherein the plurality of objects in the scene are specified in a virtual reality framework using a hypertext markup language, and wherein the plurality of objects comprise an avatar controlled by a second user of the video conferencing application;
   in response to the determining, transforming the particular object with respect to at least one of position, rotation, or scale;
   in response to the transformation, determining how the plurality of objects interact with one another, comprising:
   for each object in the plurality of objects, determining whether the respective object is fixed or dynamic by referencing the tree hierarchy, wherein a fixed object cannot move, transform, or rotate within the 3D virtual environment;
   for each pair of objects in the plurality of objects:
      determining whether both objects in the respective pair are fixed; and
      when both objects in the respective pair are determined to be fixed, disabling a simulation of physical interaction between the two objects; and
   rendering the scene using a rendering engine comprising a cross-browser Javascript library that creates a graphical processing unit (GPU)-accelerated 3D animation in a web browser based on the scene to represent a virtual camera of the user in the video conferencing application, wherein a fixed object is rendered only once for each position of the virtual camera.

2. The method of claim 1, further comprising:
   in response to determining that at least one object in the respective pair is dynamic, conducting the simulation of physical interaction between the two objects.

3. The method of claim 2, wherein the conducting the simulation of physical interaction comprises:
   determining whether a collision occurs between the objects in the respective pair; and
   in response to determining that the collusion occurs, preventing the objects in the respective pair from penetrating one another.

4. The method of claim 2, wherein the plurality of objects comprise fixed objects representing an arena.

5. The method of claim 1, wherein the avatar represents a virtual camera controlled by the second user.

6. The method of claim 5, further comprising:
   receiving a video stream captured of the second user; and
   mapping the video stream onto the avatar.

7. The method of claim 1, further comprising:
   in response to determining that none of the plurality of objects are dynamic, skipping physics simulation for the plurality of objects.

8. The method of claim 1, wherein the avatar is represented in the tree hierarchy and has a back child node and a video child node in the tree hierarchy.

9. A computer-readable non-transitory storage medium comprising instructions which, when executed by a computer, cause the computer to carry out operations for optimizing physics simulation of a three-dimensional ("3D") virtual environment, the operations comprising:
   evaluating each object in a plurality of objects displayed in a scene of a video conferencing application to a user to determine that a particular object's position, rotation, or scale has changed, wherein each object in the plurality of objects is represented by a node in a tree hierarchy, wherein the plurality of objects in the scene are specified in a virtual reality framework using a hypertext markup language, wherein the plurality of objects comprise an avatar controlled by a second user of the video conferencing application;
   in response to the determining, transforming the particular object with respect to at least one of position, rotation, or scale;
   in response to the transformation, determining how the plurality of objects interact with one another, comprising:
   for each object in the plurality of objects, determining whether the respective object is fixed or dynamic by referencing the tree hierarchy, wherein a fixed object cannot move, transform, or rotate within the 3D virtual environment;
   for each pair of objects in the plurality of objects:
      determining whether both objects in the respective pair are fixed; and when both objects in the respective pair are determined to be fixed, disabling a simulation of physical interaction between the two objects; and rendering the scene using a rendering engine comprising a cross-browser Javascript library that creates a graphical processing unit (GPU)-accelerated 3D animation in a web browser based on the scene to represent a virtual camera of the user in the video conferencing application, wherein a fixed object is rendered only once for each position of the virtual camera.

10. The computer-readable non-transitory storage medium of claim 9, the operations further comprising:
in response to determining that at least one object in the respective pair is dynamic, conducting the simulation of physical interaction between the two objects.

11. The computer-readable non-transitory storage medium of claim 10, wherein the conducting the simulation comprises:
determining whether a collision occurs between the objects in the respective pair; and
in response to determining that the collision occurs, preventing the objects in the respective pair from penetrating one another.

12. The computer-readable non-transitory storage medium of claim 10, wherein the plurality of objects comprise fixed objects representing an arena.

13. The computer-readable non-transitory storage medium of claim 9, wherein the avatar represents a virtual camera controlled by the second user.

14. The computer-readable non-transitory storage medium of claim 13, the operations further comprising:
receiving a video stream captured of the second user; and
mapping the video stream onto the avatar.

15. The computer-readable non-transitory storage medium of claim 9, wherein the avatar is represented in the tree hierarchy and has a back child node and a video child node in the tree hierarchy.

16. A system for optimizing physics simulation in a three-dimensional ("3D") virtual environment including a plurality of objects displayed in a scene of a video conferencing application to a user, comprising:
a memory;
at least one processor coupled to the memory and configured to:
evaluate each object in the plurality of objects to determine that a particular object's position, rotation, or scale has changed, wherein each object in the plurality of objects is represented by a node in a tree hierarchy, wherein the plurality of objects in the scene are specified in a virtual reality framework using a hypertext markup language, wherein the plurality of objects comprise an avatar controlled by a second user of the video conferencing application;
in response to the determining, transform the particular object with respect to at least one of position, rotation, or scale;
in response to the transformation, determine how the plurality of objects interact with one another, comprising:
(i) for each object in the plurality of objects, determine whether the respective object is fixed or dynamic by referencing the tree hierarchy, wherein a fixed object cannot move, transform, or rotate within the 3D virtual environment,
(ii) for each pair of objects in the plurality of objects, determine whether both objects in the respective pair are fixed, and
(iii) when both objects in the respective pair are determined to be fixed, disable a simulation of physical interaction between the two objects; and
render the scene using a rendering engine comprising a cross-browser Javascript library that creates a graphical processing unit (GPU)-accelerated 3D animation in a web browser based on the scene to represent a virtual camera of the user in the video conferencing application, wherein a fixed object is rendered only once for each position of the virtual camera.

17. The system of claim 16, the at least one processor further configured to:
in response to determining that at least one object in the respective pair is dynamic, conduct the simulation of physical interaction between the two objects.

18. The system of claim 16, the at least one processor further configured to:
determine whether a collision occurs between the objects in the respective pair; and
in response to determining that the collusion occurs, prevent the objects in the respective pair from penetrating one another.

19. The system of claim 16, wherein the avatar represents a virtual camera controlled by the second user.

20. The system of claim 19, the at least one processor further configured to:
receive a video stream captured of the second user; and
map the video stream onto the avatar.

21. The system of claim 16, wherein the avatar is represented in the tree hierarchy and has a back child node and a video child node in the tree hierarchy.

* * * * *

UNITED STATES PATENT AND TRADEMARK OFFICE
CERTIFICATE OF CORRECTION

PATENT NO. : 12,368,821 B2
APPLICATION NO. : 17/875581
DATED : July 22, 2025
INVENTOR(S) : Krol et al.

Page 1 of 1

It is certified that error appears in the above-identified patent and that said Letters Patent is hereby corrected as shown below:

In the Claims

In Column 32, Claim 3, Line 22, delete "collusion" and insert -- collision --, therefor.

In Column 34, Claim 18, Line 38, delete "collusion" and insert -- collision --, therefor.

Signed and Sealed this
Fourth Day of November, 2025

John A. Squires
*Director of the United States Patent and Trademark Office*